US011783486B2

(12) United States Patent
Swaminathan et al.

(10) Patent No.: US 11,783,486 B2
(45) Date of Patent: *Oct. 10, 2023

(54) DEPICTING HUMANS IN TEXT-DEFINED OUTFITS

(71) Applicant: Adobe Inc., San Jose, CA (US)

(72) Inventors: Viswanathan Swaminathan, Saratoga, CA (US); Gang Wu, San Jose, CA (US); Akshay Malhotra, Arlington, TX (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/553,114

(22) Filed: Dec. 16, 2021

(65) Prior Publication Data
US 2022/0108509 A1 Apr. 7, 2022

Related U.S. Application Data

(63) Continuation of application No. 16/804,822, filed on Feb. 28, 2020, now Pat. No. 11,210,831.

(51) Int. Cl.
G06T 7/00 (2017.01)
G06T 7/11 (2017.01)
(Continued)

(52) U.S. Cl.
CPC ............ G06T 7/11 (2017.01); G06F 18/214 (2023.01); G06F 18/217 (2023.01); G06N 3/08 (2013.01);
(Continued)

(58) Field of Classification Search
CPC ............ G06T 7/11; G06T 7/70; G06T 11/60; G06T 2207/10016; G06T 2207/20081;
(Continued)

(56) References Cited

U.S. PATENT DOCUMENTS 10,109,051 B1 * 10/2018 Natesh ................ G06V 10/56
10,346,893 B1 * 7/2019 Duan .................... G06N 3/08
(Continued)

OTHER PUBLICATIONS

"Notice of Allowance", U.S. Appl. No. 16/804,822, filed Aug. 19, 2021, 7 pages.
(Continued)

Primary Examiner — Ping Y Hsieh
(74) Attorney, Agent, or Firm — FIG. 1 Patents

(57) ABSTRACT

Generating images and videos depicting a human subject wearing textually defined attire is described. An image generation system receives a two-dimensional reference image depicting a person and a textual description describing target clothing in which the person is to be depicted as wearing. To maintain a personal identity of the person, the image generation system implements a generative model, trained using both discriminator loss and perceptual quality loss, which is configured to generate images from text. In some implementations, the image generation system is configured to train the generative model to output visually realistic images depicting the human subject in the target clothing. The image generation system is further configured to apply the trained generative model to process individual frames of a reference video depicting a person and output frames depicting the person wearing textually described target clothing.

20 Claims, 9 Drawing Sheets
(4 of 9 Drawing Sheet(s) Filed in Color)

(51) Int. Cl.
| | |
|---|---|
| G06T 11/60 | (2006.01) |
| G06T 7/70 | (2017.01) |
| G06N 3/08 | (2023.01) |
| G06V 40/10 | (2022.01) |
| G06F 18/214 | (2023.01) |
| G06F 18/21 | (2023.01) |
| G06V 10/774 | (2022.01) |
| G06V 10/776 | (2022.01) |
| G06V 10/82 | (2022.01) |

(52) U.S. Cl.
CPC ............... *G06T 7/70* (2017.01); *G06T 11/60* (2013.01); *G06V 10/774* (2022.01); *G06V 10/776* (2022.01); *G06V 10/82* (2022.01); *G06V 40/10* (2022.01); *G06V 40/103* (2022.01); *G06T 2207/10016* (2013.01); *G06T 2207/20081* (2013.01); *G06T 2207/20084* (2013.01); *G06T 2207/30168* (2013.01); *G06T 2207/30196* (2013.01)

(58) Field of Classification Search
CPC . G06T 2207/20084; G06T 2207/30168; G06T 2207/30196; G06T 11/00; G06T 7/20; G06F 18/214; G06F 18/217; G06N 3/08; G06N 3/045; G06N 3/047; G06V 10/774; G06V 10/776; G06V 10/82; G06V 40/10; G06V 40/103
See application file for complete search history.

(56) References Cited

U.S. PATENT DOCUMENTS

| | | | | |
|---|---|---|---|---|
| 10,614,342 | B1 * | 4/2020 | Lorbert | ............... G06V 10/764 |
| 11,210,831 | B2 | 12/2021 | Swaminathan et al. | |
| 2021/0065418 | A1 * | 3/2021 | Han | ........................ G06T 7/73 |

OTHER PUBLICATIONS

"Pre-Interview First Office Action", U.S. Appl. No. 16/804,822, filed Jul. 13, 2021, 3 pages.
Arjovsky, Martin et al., "Wasserstein Generative Adversarial Networks", Jan. 2017, 10 pages.
Chen, Dongdong , "Coherent Online Video Style Transfer", Mar. 28, 2017, 10 pages.
Chen, Qifeng et al., "Photographic Image Synthesis with Cascaded Refinement Networks", Proceedings of the IEEE International Conference on Computer Vision [retrieved Feb. 2, 2022]. Retrieved from the Internet <https://cqf.io/papers/Photographic_Image_Synthesis_ICCV2017.pdf>., Jul. 28, 2017, 10 pages.
Chintala, Soumith et al., "How to Train a GAN? Tips and tricks to make GANs work", Retrieved at: https://github.com/soumith/ganhacks/blob/master/README.md—on Dec. 3, 2019, 2016, 5 pages.
Denton, Emily , "Stochastic Video Generation with a Learned Prior", Mar. 2, 2018, 12 pages.
Farneback, Gunnar , "Two-Frame Motion Estimation Based on Polynomial Expansion", Jun. 2003, 8 pages.
Gemp, Ian , "Global Convergence to the Equilibrium of GANs using Variational Inequalities", May 20, 2019, 51 pages.
Goodfellow, Ian J. et al., "Generative Adversarial Nets", In: Advances in neural information processing systems (2014) [retrieved Feb. 17, 2022]. Retrieved from the Internet <https://www.cs.utah.edu/~zhe/teach/archived/2019f/6190-pdf/gans.pdf>., Jun. 10, 2014, 9 pages.
Gunel, Mehmet et al., "Language Guided Fashion Image Manipulation with Feature-wise Transformations", Aug. 12, 2018, 11 pages.
Isola, Phillip et al., "Image-to-Image Translation with Conditional Adversarial Networks", 2017 IEEE Conference on Computer Vision and Pattern Recognition (CVPR) [retrieved Feb. 24, 2022]. Retrieved from the Internet <https://gangw.web.illinois.edu/class/cs598/papers/CVPR17-img2img.pdf>., Nov. 22, 2017, 17 pages.
Li, Yitong et al., "Video Generation From Text", Oct. 1, 2017, 8 pages.
Liang, Xiaodan et al., "Look into Person: Joint Body Parsing & Pose Estimation Network and A New Benchmark", Apr. 5, 2018, 14 pages.
Liu, Kuan-Hsien et al., "MVC: A Dataset for View-Invariant Clothing Retrieval and Attribute Prediction", Jun. 2016, 4 pages.
Lucas, Bruce D. , "An Iterative Image Registration Technique with an Application to Stereo Vision", Proceedings of 7th International Joint Conference on Artificial Intelligence (LICAI), Aug. 24-28, 1981, Vancouver, British Columbia, Aug. 24, 1981, pp. 674-679.
Mao, Xudong et al., "Least Squares Generative Adversarial Networks", IEEE, 2017, [retrieved on Dec. 10, 2021], Retrieved from the Internet <https://arxiv.org/pdf/1611.04076.pdf>, Apr. 5, 2017, 16 pages.
Mertikopoulos, Panayotis et al., "Mirror descent in saddle-point problems: Going the extra (gradient) mile", Oct. 1, 2018, 26 pages.
Pan, Yingwei et al., "To Create What You Tell: Generating Videos from Captions", Oct. 2017, 10 pages.
Radford, Alec et al., "Unsupervised Representation Learning with Deep Convolutional Generative Adversarial Networks", ICLR 2016, Jan. 7, 2016, 16 pages.
Reed, Scott et al., "Generative Adversarial Text to Image Synthesis", Jun. 5, 2016, 10 pages.
Reed, Scott et al., "Learning Deep Representations of Fine-Grained Visual Descriptions", Proceedings of the IEEE Conference on Computer Vision and Pattern Recognition. 2016., May 17, 2016, 10 pages.
Simonyan, Karen et al., "Very Deep Convolutional Networks for Large-Scale Image Recognition", arXiv Preprint, Cornell University, arXiv.org [retrieved Feb. 24, 2022]. Retrieved from the Internet <https://arxiv.org/pdf/1409.1556.pdf>., Sep. 2014, 14 pages.
Tulyakov, Sergey et al., "MoCoGAN: Decomposing Motion and Content for Video Generation", Dec. 14, 2017, 13 pages.
Wang, Ting-Chun et al., "Video-to-Video Synthesis", Dec. 3, 2018, 14 pages.
Xu, Tao et al., "AttnGAN: Fine-Grained Text to Image Generation with Attentional Generative Adversarial Networks", Nov. 28, 2017, 9 pages.
Zhang, Han et al., "StackGAN: Text to Photo-realistic Image Synthesis with Stacked Generative Adversarial Networks", Aug. 5, 2017, 14 pages.
Zhang, Han , "StackGan++: Realistic Image Synthesis with Stacked Generative Adversarial Networks", Oct. 19, 2017, 15 pages.
Zhu, Jun-Yan et al., "Unpaired Image-to-Image Translation using Cycle-Consistent Adversarial Networks", 2017 IEEE International Conference on Computer Vision (ICCV) [retrieved Dec. 13, 2021]. Retrieved from the Internet <https://eva.fing.edu.uy/pluginfile.php/320560/mod_resource/content/1/Zhu_Unpaired_Image-To-Image_Translation_ICCV_2017_paper.pdf>., Nov. 15, 2018, 10 pages.
Zhu, Shizhan et al., "Be Your Own Prada: Fashion Synthesis with Structural Coherence", Oct. 19, 2017, 10 pages.

* cited by examiner

DEPICTING HUMANS IN TEXT-DEFINED OUTFITS

RELATED APPLICATIONS

This application is a continuation of and claims priority to U.S. patent application Ser. No. 16/804,822, filed Feb. 28, 2020, entitled "Depicting Humans in Text-Defined Outfits," the disclosure of which is hereby incorporated by reference in its entirety.

BACKGROUND

With advances in computing device technology, machine learning models have become an increasingly popular tool for use in digital image generation and processing tasks. However, despite these technological advances, it remains a challenge to transform data from an input space to a different output space. For instance, while various machine learning models have been trained to automatically caption images based on their included content, these machine learning models often identify only a subset of objects depicted in an image and fail to capture an entirety of the subject matter depicted in the image. This challenge of transforming data from an input space to an output space is readily observed in conventional approaches that attempt to translate text directly into image pixels. For instance, conventional text-to-image translation approaches often output synthesized images depicting an object whose appearance is easily discernable from a corresponding real-world appearance of the object. In an attempt to produce more realistic images, some conventional approaches have narrowly focused on a specific and niche subset of objects, such as flowers or birds. These conventional approaches attempt to train a machine learning model to identify object (e.g., bird or flower) features and attributes using a large training set including depicting a diverse range of different objects and accompanying textual descriptions describing the object's features and attributes.

While some conventional approaches have developed improvement in synthesizing an image of a bird or a flower from textual descriptions, the resulting image quality and depicted objects are readily identified by casual human observation as unrealistic. These realism issues are further emphasized upon closer observation of the digital image, as there are many plausible configurations of pixels that will correctly illustrate a textual description. As such, adjacent pixels depicting the same object may be assigned different color values, different intensities, and so forth, thereby resulting in a lack of visual cohesion among different aspects of a single depicted object. Consequently, conventional approaches to generating images from textual input lack realism and generate images depicting objects that are readily discernable from their real-world counterparts.

SUMMARY

Generating images and videos depicting a human subject wearing textually defined attire is described. An image generation system receives a two-dimensional reference image depicting a person and a textual description describing target clothing in which the person is to be depicted as wearing. In order to output a realistic image depicting the person wearing the target clothing in a manner that maintains a personal identity of the person, the image generation system implements a generative model configured to generate images from text by being trained using both discriminator loss and perceptual quality loss. In some implementations, the image generation system is configured to train the generative model using a plurality of training sets, where each training set includes a textual description of target clothing and a ground truth image depicting a human subject wearing the target clothing. For each of the plurality of training sets, the image generation system is configured to generate a segmentation map that defines different regions of the human subject depicted in the ground truth image. Using the textual description, the image generation system then identifies one or more of the different regions defined by the segmentation map that will need to be modified in order to depict the target clothing.

These different regions of the segmentation map are then used to generate a masked version of the reference image, which defines pixels that are to be altered and pixels that are to be maintained in generating an output image depicting the human subject wearing the target clothing. The masked image, the segmentation map, and a text vector representing the textual description of target clothing are then provided to each of a plurality of generation stages of the generative model while the model attempts to render the human subject as wearing the textually described target clothing. Training outputs of the generative model are then compared against the ground truth images of the training dataset to determine one or more of the discriminator loss or the perceptual quality loss for the model, which may be used individually or in combination with one another to converge parameters of the generative model towards their optimal state. By virtue of this training process, the generative model is configured to output an image depicting the person wearing target clothing, given a reference image of the person and a textual description of the target clothing.

Because pixels depicting personally identifiable features (e.g., hair, skin, face, etc.) are preserved in the image generation process, the resulting output image similarly retains the visually realistic appearance of the input reference image. The image generation system is further configured to apply the trained generative model to process individual frames of a reference video depicting a person and output frames depicting the person wearing textually described target clothing. To mitigate visual discrepancies between pixels of contiguous output frames (e.g., slightly different colors depicting a same article of clothing in sequential frames), the image generation system is further configured to determine a flow region for frames of the reference video that defines an optical flow (e.g., one or more regions that depict motion during playback) for the reference video. This optical flow information is used to further process pixel values of images output from reference video frames by the image generation system, to ensure visual coherence and temporal consistency among the output images. The processed images are then output by the image generation system as a video that depicts the person in the reference video as wearing the textually described attire.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures.

DETAILED DESCRIPTION

Overview

Figure 1:
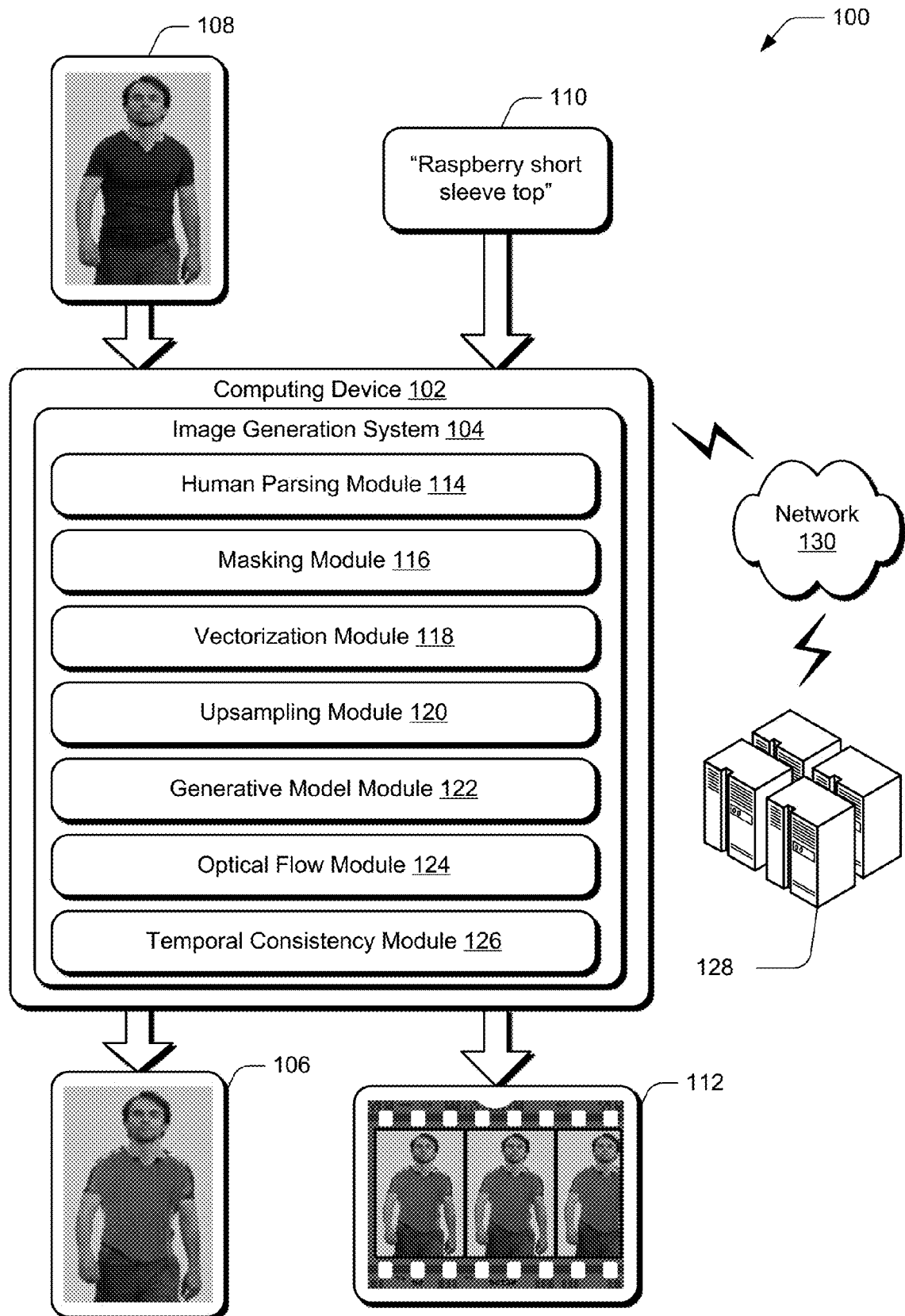
FIG. 1 is an illustration of an environment in an example implementation that is operable to employ the image generation techniques described herein.

Despite advances in computing technology, it remains a challenge to transform textual input data to image output data. Various generative models, such as generative adversarial networks (GANs) have been implemented to solve a variety of image processing tasks, such as image-to-text translation, image-to-image translation, and so forth. However, conventional approaches that implement generative models for text-to-image translation are unable to do so in a manner that produce images that appear realistic to the human eye.

In an attempt to produce realistic images from text inputs, some conventional approaches have exhaustively trained generative models using a very specific and niche data subset, such as flowers or birds. While these conventional approaches have achieved the ability to produce images that appear realistic from distant observation, closer observation reveals that the images are distinctly computer-generated and not representative of real-world appearances of their depicted objects. For instance, as there are many plausible configurations of pixels that will correctly illustrate a textual description, adjacent pixels depicting the same object may be assigned different color values, different intensities, and so forth, thereby resulting in a lack of visual cohesion among different aspects of a single depicted object. In particular, conventional approaches are unable to account for spatial positioning of different features (e.g., petals of a flower or features of a bird) when synthesizing an image of the bird or flower from text. When observed from a distance, this inability to realistically depict features of a bird or flower as having spatial relationships that otherwise occur in nature may go unnoticed, but is increasingly apparent upon closer observation.

While these realism issues persist for images depicting birds and flowers, the issues are exponentially compounded when attempting to generate images depicting human subjects. For instance, minor boundary artifacts that result from conventional image generation techniques may include a color distortion between a flower petal and its background environment. When extended to generating images depicting a human subject, these boundary artifacts may include color distortions between different regions of a human's skin, or between regions depicting a human's clothing and the human wearing the clothing. Because human eyes are naturally designed to detect even the slightest changes in a human's appearance (e.g., facial expressions, body language, etc.), these boundary artifacts are immediately identifiable as being visually unnatural, which results in poor image quality. When further extending conventional image generation approaches to video generation, boundary artifacts and color distortions in a single frame that are otherwise difficult to notice become apparent when transitioning between displays of different frames, particularly when the boundary artifacts, color distortions, and other image irregularities are different between sequential frames.

Accordingly, image and video generation using a generative model trained using both discriminator loss and perceptual quality loss is described. An image generation system is configured to train such a generative model by leveraging a plurality of training sets, where each training set includes a ground truth image depicting a human subject wearing target clothing and a textual description of the target clothing. For each of the plurality of training sets, the image generation system generates a segmentation map that defines different regions of the human subject depicted in the ground truth image. Using the textual description, the image generation system then identifies one or more of the different regions defined by the segmentation map that will need to be modified in order to depict the target clothing. Because the segmentation map is generated from the ground truth image, the one or more different regions that correspond to the textual description map directly to body parts and/or attire being worn by the human subject of the ground truth image. Accordingly, the one or more regions are used to generate a masked reference image by masking out certain pixels of the reference image that are to be altered in order to depict the human subject wearing the target clothing. The masked reference image may be represented as a binary mask, where pixel values corresponding to zero represent pixel values that are to be generated according to the text description by the generative model, while pixel values corresponding to one represent pixel values that are to be maintained by the generative model in the output image.

The masked reference image and the segmentation map are then upscaled and concatenated with various stages of the generative model (e.g., with convolutional neural network layers of a GAN) during training, thereby providing the generative model with information identifying what pixels are to be modified and what pixels are to be maintained at each stage in generating an output image. Training outputs of the generative model are then compared against the ground truth images of the training dataset to determine the discriminator loss and the perceptual quality loss, which are both subsequently used to converge parameters of the generative model towards their optimal state. Training of the generative model continues until the image generated by the generative model is within a threshold amount of difference when compared to the corresponding ground truth image of the training dataset. The trained generative model is then configured to generate an output image depicting a human subject wearing target clothing, given inputs of a reference image depicting the human subject and a textual description of the target clothing.

By virtue of training under both discriminator loss and perceptual quality loss, the resulting images output by the trained generative model are substantially more realistic in comparison to conventional approaches. This increased realism is attributable in part to the perceptual loss metric, which provides better correlation with color from the text description while allowing for potential variations introduced via noise input to the generative model during training. Similarly, the images output by the image generation system described herein include sharp boundaries between depicted objects as a result of the dual loss training approach. With better color correlation, sharp boundaries, and preservation of pixel values corresponding to personally identifiable human aspects (e.g., face, hair, and so forth), the image generation system is able to output images that appear realistic even when pixels corresponding to a depicted human subject are modified.

Because the image generation system is able to output images that depict human subjects wearing modified attire in a visually cohesive manner, the techniques described herein are further extendable to generating a video depicting a human subject wearing textually defined target clothing. To do so, the image generation system applies the trained generative model to process individual frames of a reference video in a similar manner as processing a single reference image. After generating output frames depicting a human subject of the reference video wearing textually described clothing, the image generation system is configured to identify an optical flow in frames of the reference video that depict motion during playback of the reference video. This optical flow is used to further process pixel values of video frames output by the trained generative model to ensure visual coherence and temporal consistency among the output images.

By leveraging information included in the segmentation map for a given reference image or reference video frame, the image generation system is configured to process changes for only a subset of image pixels that require modification to depict the target clothing, without altering pixels outside the subset. In this manner, the image generation system requires fewer computational resources in comparison to conventional image generation approaches that adjust or generate pixel values for each pixel of a generated image. When extended across a content delivery pipeline, the image generation system similarly requires fewer network resources to perform the image and video generation techniques described herein, while generating images and videos that display an increased amount of realism and visual cohesion.

Example Environment

FIG. 1 is an illustration of a digital medium environment 100 in an example implementation that is operable to employ the techniques described herein. The digital medium environment 100 includes a computing device 102, which may be implemented in various configurations. The computing device 102, for instance, may be configured as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers to perform operations "over the cloud" as described with respect to FIG. 9.

The computing device 102 is illustrated as including an image generation system 104. The image generation system 104 represents functionality of the computing device 102 to output an image 106 of a person wearing target clothing, given a reference image 108 depicting the person wearing different clothing and a textual description 110 of the target clothing. Additionally, the image generation system 104 represents functionality of the computing device 102 to output a video 112 comprising a plurality of frames that each depict a person wearing clothing described by the textual description 110. To generate the output image 106 and/or the video 112, the image generation system 104 employs a human parsing module 114, a masking module 116, a vectorization module 118, an upsampling module 120, a generative model module 122, an optical flow module 124, and a temporal consistency module 126. The human parsing module 114, the masking module 116, the vectorization module 118, the upsampling module 120, the generative model module 122, the optical flow module 124, and the temporal consistency module 126 are each implemented at least partially in hardware of the computing device 102 (e.g., through use of a processing system and computer-readable storage media), as described in further detail below with respect to FIG. 9.

Given the reference image 108, the human parsing module 114 is configured to generate a segmentation map that labels different parts of the human subject (e.g., face, hair, arm(s), leg(s), hand(s), foot/feet, upper body, lower body, etc.) depicted in the reference image 108. In addition, the segmentation map generated by the human parsing module 114 includes labels identifying one or more parts of clothing (e.g., upper body clothing, lower body clothing, hat, watch, jewelry, belt, shoe(s), etc.) worn by the human subject depicted in the reference image 108. The human parsing module 114 then communicates the segmentation map to the masking module 116. While the human parsing module 114 generates the segmentation map, the vectorization module 118 is configured to generate a text vector for the text description 110, which encodes information included in the text description 110 into a vector format.

The text vector is then communicated to the masking module 116, which uses the text vector to identify which portions of the reference image 108 are to be modified according to the text description 110 to generate the output image 106. For instance, in response to determining that the text description 110 indicates that the output image 106 is to depict a human wearing a "raspberry short sleeve top," the masking module 116 may identify that the text description 110 corresponds to an upper body portion of the segmentation map generated by the human parsing module 114. Alternatively, in an example implementation where the text description 110 recites "blue jeans and a Seattle Mariners baseball cap," the masking module 116 may identify that the text description 110 corresponds to a lower body portion and a head portion of the segmentation map. The masking module 116 then leverages the segmentation map to generate a masked image, which is representative of an instance of the reference image 108 with one or more portions of its human subject being masked based on the text description 110. In this manner, the masked image generated by the masking module 116 preserves pixels of the reference image 108 that are to be preserved in the output image 106 and masks other pixels of the reference image 108 that are to be altered in the output image 106.

The segmentation map generated by the human parsing module 114 and the masked image generated by the masking module 116 are then communicated to the upsampling module 120. The upsampling module 120 is representative of functionality of the image generation system 104 to upscale data to one or more sizes for use in generating the output image 106 and the video 112 using the techniques described herein. For instance, the upsampling module 120 is configured to generate an upsampled map and an upsampled image for use by the generative model module 122 to generate the output image 106, where the upsampled map and the upsampled image are provided at different sizes to a generative model (e.g., GAN, deep neural network, supervised or unsupervised machine learning model, and the like) implemented by the generative model module 122. By providing upsampled maps and images to the generative model at each stage, the generative model module 122 is provided with mask information at each processing step, which results in the output image 106 having fewer artifacts and improved image quality over conventional approaches that only provide mask information at an initial stage. The generative model module 122 is configured to both train a generative model to generate the output image 106, as well as implement a trained generative model to generate the output image 106 from the reference image 108 and the text description 110 inputs.

In addition to generating a single output image 106 from a single reference image 108, the generative model module 122 is further configured to generate multiple output images 106 given multiple reference images 108. For instance, in an example implementation where the reference image 108 represents a plurality of individual frames of a video, the generative model module 122 is configured to output a plurality of images 106, one for each of the individual frames of the video. Because each image 106 output by the generative model module 122 is generated based on a mask from the corresponding reference image 108, outputting a plurality of the images 106 as frames of a video may result in sequential video frames depicting information described by the text description 110 slightly differently (e.g., having different textures, colors, and so forth).

In order to generate the video 112 in a manner that maintains visual cohesion across sequential ones of the individual video frames represented by image 106, the image generation system 104 further employs the optical flow module 124 to identify a flow region for the different video frames. To do so, the optical flow module 124 is configured to extract optical flow information from the reference video 112. In some implementations, the optical flow module 124 analyzes each frame (e.g., each image 106) for the video 112 to determine which pixels of the frames include motion during playback of the video 112. The one or more flow regions identified by the optical flow module 124, which may collectively be referred to as an optical flow for the reference video, are then communicated to the temporal consistency module 126, which is configured to further process one or more of the images 106 prior to compiling the images 106 as individual frames into the video 112. To do so, the temporal consistency module 126 is configured to process pixels of an image 106 that are within the flow region identified by the optical flow module 124 (e.g., by transforming individual pixel values of a video frame to be more similar to corresponding pixel values of a sequentially adjacent video frame). After processing one or more of the images 106 to ensure visual cohesiveness for pixels within a flow region for the video, the temporal consistency module 126 is configured to output the video 112.

The output image(s) 106, the reference image 108, the text description 110, the video 112, the generative model trained by the generative model module 122, and other information processed or generated by the image generation system 104 may be stored in storage of the computing device 102, as described in further detail below with respect to FIG. 9. Alternatively or additionally, information received, processed, or generated by the image generation system 104, as described in further detail below with respect to FIGS. 2-8, may be communicated to a remote storage location for subsequent retrieval and/or access by the computing device 102, or one or more different computing devices. For instance, the image generation system may communicate information to remote storage 128, or directly to a different computing device, via network 130.

Having considered an example digital medium environment, consider now a discussion of an example system useable to generate an image and/or a video depicting a human subject of a reference image wearing target clothing described by a textual description in accordance with aspects of the disclosure herein.

Figure 2:
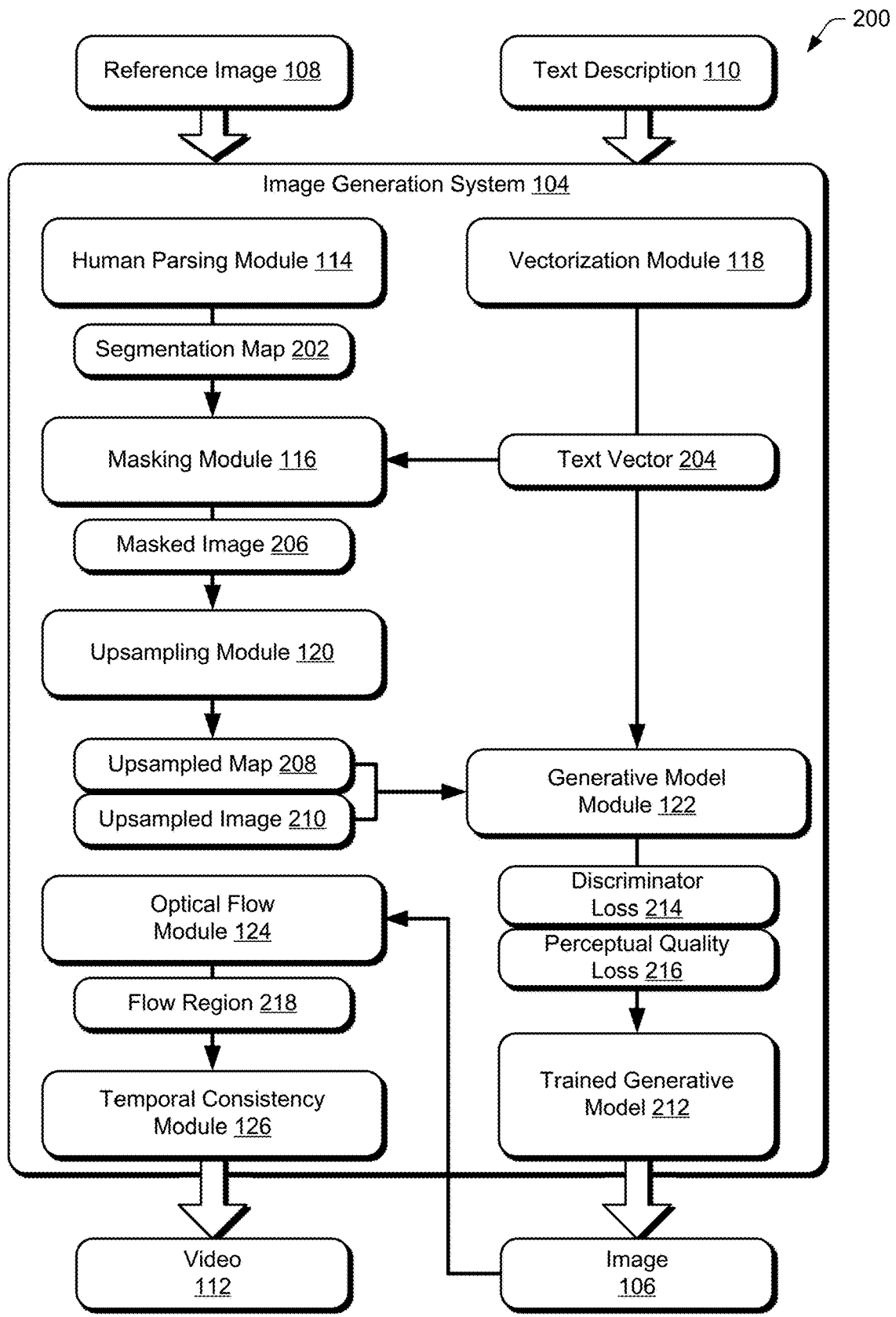
FIG. 2 illustrates an example implementation in which an image generation system of FIG. 1 generates an image or a video depicting a person wearing text-defined target clothing using techniques described herein.

FIG. 2 illustrates an example system 200 useable to generate an image and/or a video depicting a person wearing target clothing described by a textual description, given a reference image or video of the person wearing different clothing, in accordance with the techniques described herein. In the illustrated example, system 200 includes modules of the image generation system 104 as introduced with respect to FIG. 1, such as the human parsing module 114, the masking module 116, the vectorization module 118, the upsampling module 120, the generative model module 122, the optical flow module 124, and the temporal consistency module 126. System 200 may be implemented on any suitable device or combination of devices. In one example, system 200 is implemented on one computing device (e.g., computing device 102 of FIG. 1). In another example, system 200 is implemented on more than one computing device, as described in further detail below with respect to FIG. 9.

In the example system 200, the image generation system 104 receives the reference image 108. In accordance with one or more implementations, the reference image 108 is received together with a text description 110 of clothing to be worn by the human subject of the reference image 108. Alternatively, the reference image 108 and the text description 110 may be received by the image generation system 104 asynchronously, or independent of one another, from one or more sources. As described herein, the reference image 108 is representative of a two-dimensional image that depicts a human subject and optionally depicts the human subject wearing at least one article of clothing. In some implementations, the reference image 108 is representative of a single frame of a reference video, where the reference video may be received by the image generation system 104 and separated into individual reference images 108 for generating the video 112.

The text description 110 is representative of at least one word of text describing one or more of clothing or an accessory to be depicted in the output image 106 as worn by the human subject of the reference image 108. In some implementations, the text description 110 is received via input to the computing device implementing the image generation system 104, as described in further detail below with respect to FIG. 9. In some implementations, the computing device implementing the image generation system 104 is configured to generate the text description 110 from a different, non-textual, input describing clothing and/or accessories to be worn by the human subject depicted in output image 106. For instance, the computing device may receive an audio description of accessories and/or clothing and use natural language processing to generate the text description 110 from the audio description.

Upon receipt of the reference image 108, the human parsing module 14 is configured to generate a segmentation map 202 for the reference image 108. In order to generate the segmentation map 202, the human parsing module 114 implements a known human parsing network, such as a deep residual network trained to identify high-level human structure cues, such as human joints. In accordance with one or more implementations, the human parsing network implemented by the human parsing module 114 is configured to process the reference image 108 to identify nine different joints that together define a pose structure for a human subject depicted in the reference image 108, which are the centers of the regions of head, upper body, lower body, left arm, right arm, left leg, right leg, left foot, and right foot. Each region can be further parsed and defined by specific labels such as hat, hair, sunglasses, face, etc.

The human parsing module 114 may generate the segmentation map 202 by first generating parsing score maps and pose heatmaps that are useable to define different body regions and an overall pose for the human subject depicted in the reference image 108, which may be further refined via a refinement network to improve the accuracy of the segmentation map 202. In implementations where the human subject depicted in the reference image 108 is wearing clothing, the different body regions defined by the segmentation map 202 are extended to encompass clothing that covers a corresponding portion or entirety of the body region. For instance, a "left foot" region of the segmentation map 202 may be defined as including a left shoe in an example implementation where the human subject of the reference image 108 is wearing shoes. In this manner, the segmentation map 202 includes information identifying different body parts for a human depicted in the reference image 108, where the different body parts include clothing being worn by the human over the corresponding body part.

As the human parsing module 114 generates the segmentation map 202, the image generation system 104 provides the text description 110 to the vectorization module 118. Given the text description 110, the vectorization module 118 is configured to generate a text vector 204, which is representative of textual information included in the text description 110 encoded into a vector format that is suitable for input to a generative model configured to generate and output the image 106 using the techniques described herein. The vectorization module 118 is further configured to generate one or more noise vectors for use in training the generative model to output the image 106, as described in further detail below with respect to FIG. 4.

The segmentation map 202 and the text vector 204 are then provided to the masking module 116 for use in generating the masked image 206. The masked image 206 is representative of an instance of the reference image 108 with one or more human body regions specified by the segmentation map 202 masked out according to the text vector 204. The one or more regions of the masked image 206 that are "masked out," each include a set of pixels with values replaced with mask pixel values (e.g., zero), while pixels of the reference image 108 that are to be preserved in the output image 106 are represented by their original pixel values. The masked regions of the masked image 206 are determined by comparing the text vector 204 to the segmentation map 202 and identifying the corresponding regions of the segmentation map 202 that correspond to the target clothing described by the text description 110. For instance, in response to determining, from the text vector 204, that the text description 110 describes a "raspberry short sleeve top," the masking module 116 may identify that the text vector 204 indicates an upper body region of the segmentation map 202 is to be masked in the masked image 206. The masking module 116 then uses original pixel values of the reference image 108 corresponding to all regions of the segmentation map 202 not identified by the text vector 204 to generate the masked image 206, and assigns the mask value to pixels of the reference image 108 corresponding to regions of the segmentation map 202 identified by the text vector 204.

Figure 3:
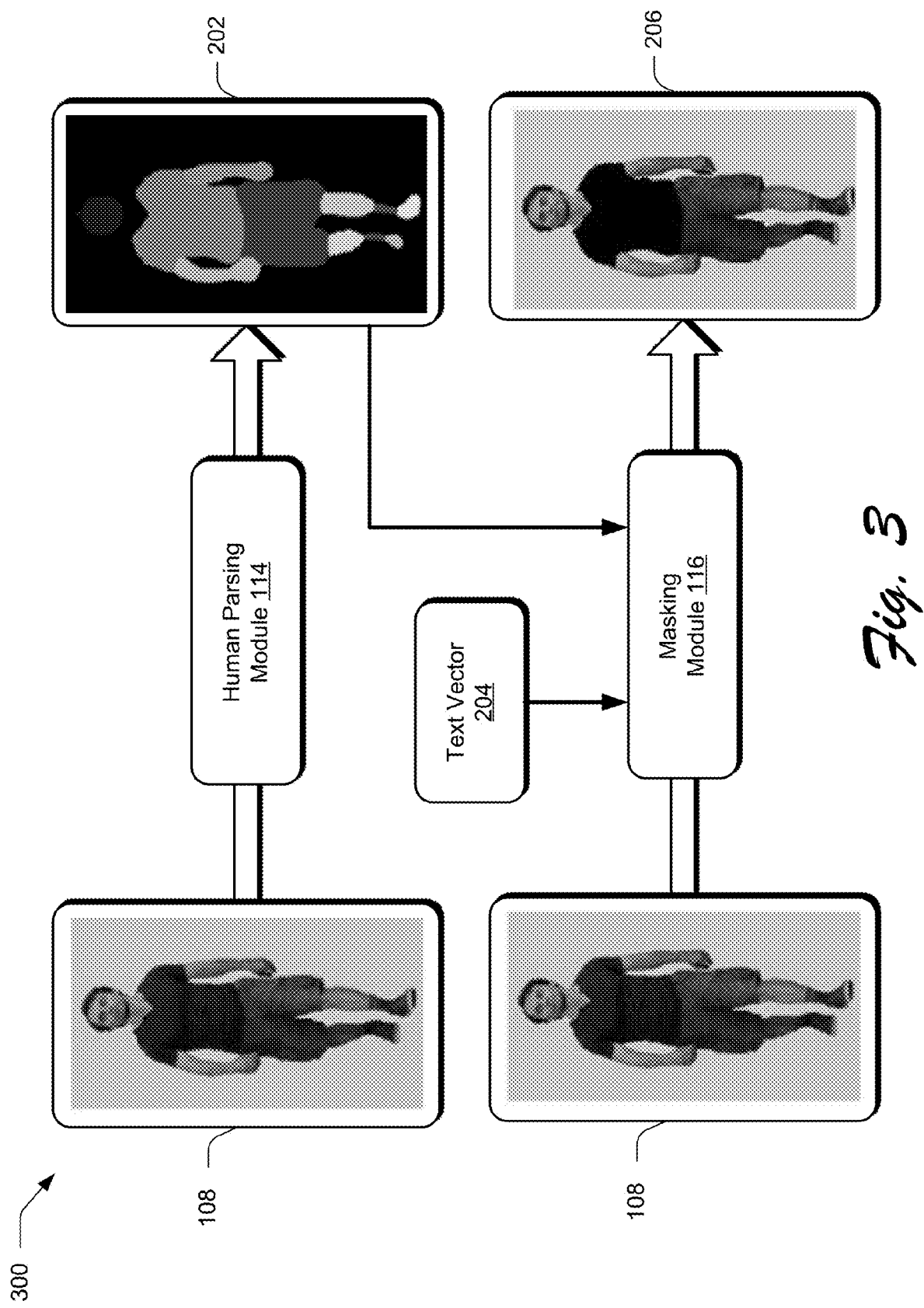
FIG. 3 illustrates an example implementation of a segmentation map and a masked image generated from a reference image by the image generation system of FIG. 1.

FIG. 3 illustrates an example 300 of a segmentation map 202 generated by the human parsing module 114 from a reference image 108 and a masked image 206 generated by the masking module 116 from the reference image 108, the segmentation map 202, and the text vector 204. In the illustrated example 300, the segmentation map 202 includes a segmentation of the human subject depicted in the reference image 108 into nine different regions: a head region colored in dark blue, an upper body clothing region colored in orange, left and right arms colored in different shades of blue, a lower body clothing region colored in greenish-blue, left and right legs colored in different shades of blue and green, and right and left feet colored in orange and yellow, respectively. In some implementations, the segmentation map 202 is configured as a single binary mask, where "ones" in the binary mask indicate human body regions (except for face and hair) and "zeroes" in the binary mask represent regions of the reference image 108 that do not depict human body parts.

Although not illustrated, the segmentation map 202 may further include information specifying one or more reserved regions, which are each representative of information describing physical attributes of the human subject depicted in the reference image 108, such as face attributes, skin attributes, hair attributes, and the like, which enable the image generation system 104 to maintain an identity of the person depicted in the reference image 108 when generating the image 106. For instance, the human parsing module 114 may extract red, green, blue (RGB) channels of face, skin, and hair regions of the person depicted in the reference image 108 in the form of feature maps to be preserved in generating the image 106.

The segmentation map 202 and the text vector 204 are then communicated to the masking module 116 for use in generating the masked image 206. The masking module 116 identifies one or more regions of the segmentation map 202 identified by the text vector 204 that are to be modified in order for the image generation system 104 to output the image 106 depicting the human subject of the reference image 108 wearing target clothing. In the illustrated example 300, the reference image 108 depicts a man wearing a blue shirt, red shorts, blue socks, and black and white shoes on a green background. The text vector 204 is representative of information specified by the text description 110, such as the text description "raspberry short sleeve top" illustrated in FIG. 1.

Given such a text description 110, the masking module 116 is configured to identify that the text vector 204 specifies that an upper body clothing region of the reference image 108 is to be modified, while other regions of the reference image 108 are to be preserved. The masking module 116 then considers the segmentation map 202 to ascertain which pixels of the reference image 108 correspond to the upper body clothing region and outputs the masked image 206 with pixels corresponding to the upper body clothing region masked out, and all other pixels retaining their original pixel values as represented by reference image 108. This masking of pixels corresponding to the upper body clothing region of the reference image 108 is represented in the illustrated example 300 at the masked image 206 by replacing previously blue pixels of the human subject's shirt with black, masked pixel values. In this manner, the masking module 116 is configured to generate a masked image 206 that preserves pixel values to be maintained in the output image 106 and masks pixel values that are to be adjusted in the output image 106 to depict the human subject wearing target clothing described by the text description 110 from which the text vector 204 was generated.

Returning to FIG. 2, the masking module 116 communicates the masked image 206 to the upsampling module 120 together with the segmentation map 202. The upsampling module 120 is configured to generate, from the segmentation map 202, an upsampled map 208. In addition, the upsampling module 120 is configured to generate, from the masked image 206, an upsampled image 210. The upsampling module 120 is configured to generate a plurality of different upsampled maps 208 for a single segmentation map 202 as well as a plurality of upsampled images 210 for a single masked image 206. These upsampled maps 208 and upsampled images 210 are generated at a size that corresponds with a current input size for an upsampling stage of a generative model implemented by the generative model module 122, such that the generative model is provided with information describing pixels belonging to each individual region to be modified in generating the image 106 as well as information describing pixels that are to be maintained at each stage of the generation process. In this manner, information included in the segmentation map 202 as well as the masked image 206 is available to the generative model at all stages involved with image generation, thereby resulting in an output image 106 that includes minimal artifacts and distortions, particularly when compared to images generated using conventional techniques. Use of the upsampled map 208 and upsampled image 210 are described and illustrated in further detail below with respect to FIG. 4.

The upsampling module 120 is configured to communicate the upsampled map(s) 208 and upsampled image(s) 210 to the generative model module 122 for processing by a trained generative model 212. The trained generative model 212 is representative of functionality of the generative model module 122 to output an image 106 that depicts the human subject of the reference image 108 as wearing target clothing described by the text description 110. In accordance with one or more implementations, the trained generative model 212 is generated by the generative model module 122 using both discriminator loss 214 and perceptual quality loss 216, as described in further detail below with respect to FIG. 4. As described herein, the discriminator loss 214 is representative of information describing classification differences between an image output by the generative model and ground truth classifications of training images. The perceptual quality loss 216 is representative of information describing a visual difference between two images, and may be used to quantify differences between an image output by the generative model from a textual description of a training dataset and the corresponding ground truth image of the training dataset.

By training the trained generative model 212 using both discriminator loss 214 and perceptual quality loss 216, the generative model module 122 is configured to generate the trained generative model 212 in a manner that outputs images having sharp image boundaries and strong correlations among different colors depicted in the output images. Using the upsampled map(s) 208, the upsampled image(s) 210, and the text vector 204, the generative model module 122 is configured to cause the trained generative model 212 to output the image 106 as depicting a human subject of the reference image 108 wearing target clothing described by the text description 110.

In addition to generating a single image 106 depicting a human subject of a reference image 108 wearing clothing described by the text description 110, the techniques described herein are similarly applicable to generating a video 112 depicting a human subject of a reference video as wearing clothing described by the text description 110. For instance, in an example scenario where the image generation system 104 receives a reference video to be modified by the text description 110, the image generation system 104 is configured to parse the reference video into individual frames, which in turn may each be processed as a reference image 108 to generate a modified frame, represented by image 106, using the techniques described herein. However, because each frame of such a reference video is processed individually using a segmentation map 202 and a masked image 206 generated specifically for that frame, compiling different images 106 generated by the image generation system 104 into the video 112 may result in continuity issues (e.g., different colors, different textures, combinations thereof, and so forth) between sequential frames, thereby diminishing a visual cohesiveness of the video 112.

To mitigate these continuity and coherence issues, the image generation system 104 is configured to further process different frames of a reference video after generating an image 106 for each reference frame using the techniques described herein. To do so, the image generation system 104 passes an image 106 generated for each frame of a reference video to the optical flow module 124. The optical flow module 124 then processes the received set of images 106 to determine pixels of the images 106 that include motion during playback of the video 112. Pixels of the images 106 that include motion are identified by the optical flow module 124 and output as the flow region 218, which specifies a set of pixels between an initial frame (e.g., an initial image 106) and a final frame (e.g., a final image 106) included during playback of the video 112.

The flow region 218 is then communicated with the plurality of video frames individually represented by image 106 to the temporal consistency module 126. The temporal consistency module 126 is configured to process pixels of the images 106 specified by the flow region 218 to ensure visual continuity and coherence when transitioning between sequential ones of the images 106. For instance, the temporal consistency module 126 may modify pixel values of one frame by changing the pixel values to align with corresponding pixel values of an adjacent frame, such that there are no sudden and unexpected transitions (e.g., different colors, color shades, etc.) between consecutive frames. In this manner, the temporal consistency module 126 is configured to use the flow region 218 to produce the human subject of the reference video (e.g., the human subject depicted in reference image 108) in different poses as wearing the desired attire described by the text description 110. A determination of the flow region 218 for images 106 corresponding to different reference video frames and use of the flow region 218 to improve temporal coherency among video frames is described and illustrated in further detail below with respect to FIG. 5.

After processing different video frames according to the flow region 218, the temporal consistency module 126 is configured to compile the processed frames into a single video 112 for playback, where the video 112 depicts a human subject of a reference video as wearing attire described by the textual description 110.

Having considered an example system useable to an image and/or a video depicting a person wearing textually described target clothing, consider now example implementations of training a generative model and using the trained generative model to output an image depicting a person wearing textually described target clothing in accordance with aspects of the disclosure herein.

Figure 4:
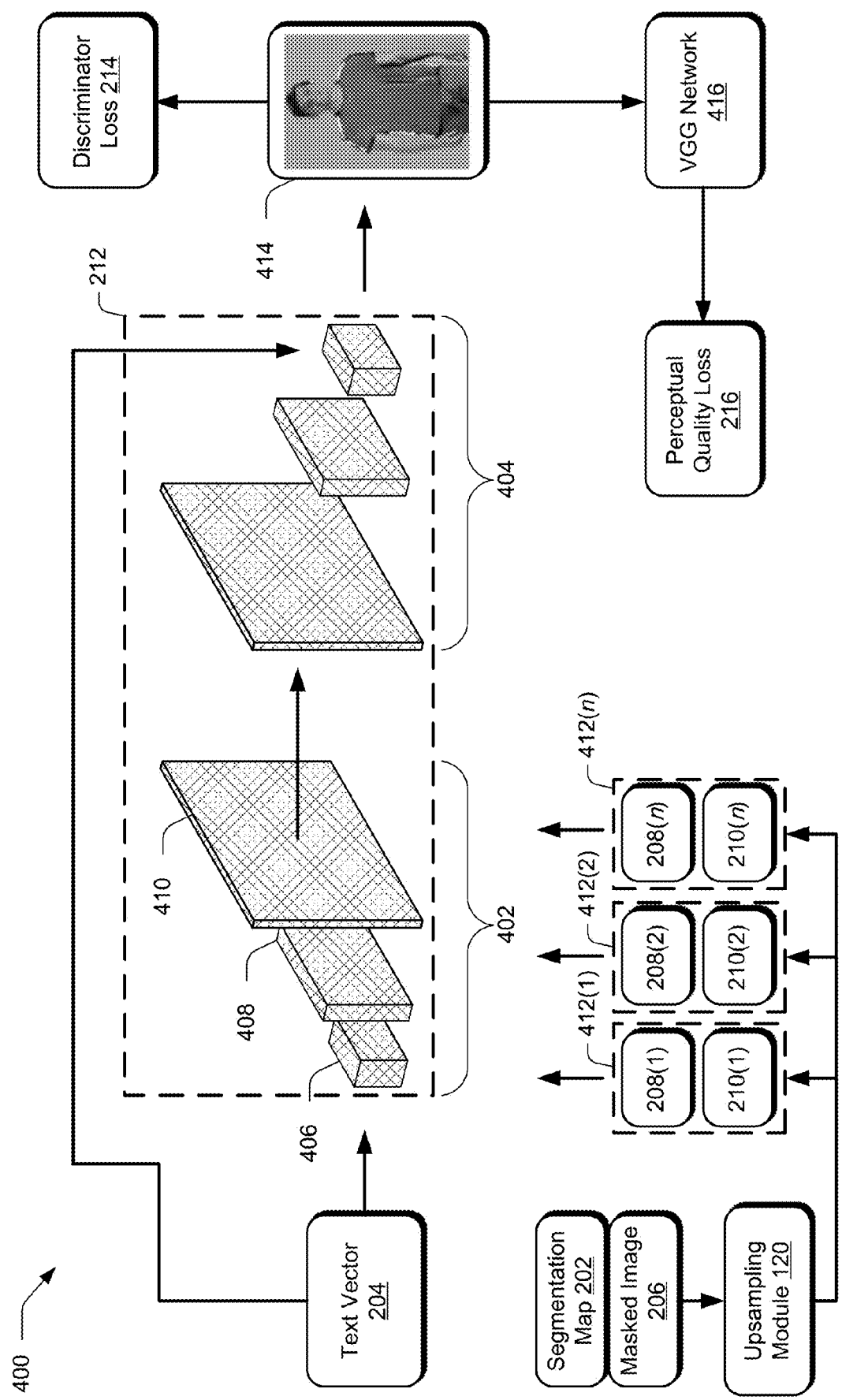
FIG. 4 illustrates an example implementation of training a generative model for generating an image that depicts a human wearing text-defined target clothing using discriminator loss and perceptual quality loss.

FIG. 4 illustrates an example implementation 400 of the generative model module 122 of the image generation system 104 generating a trained generative model 212 that is configured to output an image 106 depicting a person wearing clothing described by a text description 110 in accordance with the techniques described herein. To generate the trained generative model 212, the generative model module 122 receives a plurality of training sets, where each training set includes a reference image depicting a person, a textual description of target clothing, and a ground truth image depicting the person wearing the target clothing. For each training set, the image generation system 104 is configured to generate a text vector 204 from the textual description of target clothing and generate a segmentation map 202 and a masked image 206 from the reference image depicting the person. Generation of the segmentation map 202, the text vector 204, and the masked image 206 for each training set is performed using the human parsing module 114, the vectorization module 118, and the masking module 116, as described above with respect to FIG. 2. The trained generative model 212 is representative of any suitable type of generative machine learning model configured for image generation, such as a convolutional neural network, a deep convolutional neural network, a GAN, combinations thereof, and so forth.

In the illustrated example of FIG. 4, the trained generative model 212 generated by the generative model module 122 is illustrated as a GAN having an architecture defined by two portions, a generator portion 402 and a discriminator portion 404. In order to generate the trained generative model 212, the generative model module 122 is configured to cause the generator portion 402 and the discriminator portion 404 to compete in an adversarial objective (e.g., a min-max game). The generator portion 402's objective is to generate samples that could fool the discriminator portion 404, while the discriminator portion 404 learns in a supervised setting to perform the binary classification task of differentiating between the samples generated by the generator portion 402 and the ground truth images included in the training sets. Mathematically, the generative model module 122 is configured to generate the trained generative model 212 by causing the generative model 212 to solve the following optimization task set forth in Equation 1, where G(•) represents the generator portion 402 and D(•) represents the discriminator portion 404.

$$\min_G \max_D \mathbb{E}_{x \sim p_{data}(x)}[\log D(x)] + \mathbb{E}_{z \sim p_z(z)}[\log(1-D(G(z)))] \quad \text{(Eq. 1)}$$

As set forth in Equation 1, $\mathbb{E}$ represents the expectation operator, z represents a Gaussian input noise sample from the probability distribution p(z), and x represents a data sample from the data probability distribution $p_{data}$. In this manner, the trained generative model 212 may be configured using a deep convolutional generative adversarial network (DC-GAN) architecture configured to generate realistic images. To accommodate for different poses of a person depicted in the reference images used to train the trained generative model 212, the generative model module 122 is further configured to account for pose information describing body positions of human subjects depicted in the reference images of the training set.

In training the generative model 212, for a given reference image included in a training set, the generative model module 122 provides a text vector 204 generated from the corresponding textual description of target clothing for the training set to the generator portion 402. Additionally, in training implementations the generative model module 122 is configured to concatenate the text vector 204 together with a noise vector, thereby causing the generator portion 402 to generate samples that could potentially fool the discriminator portion 404 in the min-max training game. Given the concatenated vector generated form the text vector 204 and the noise vector, the generative model module 122 first passes the concatenated vector through a dense layer 406 of the generator portion 402 to reshape the vector to a pixel block (e.g., a 4×4 pixel block).

This pixel block is subsequently scaled through a plurality of upsampling stages, such as upsampling stage 408 and upsampling stage 410. For instance, the upsampling stage 408 may receive a 4×4 pixel block as input and scale the pixel block to output an 8×8 pixel block, which is further scaled by upsampling stage 410 to output a 16×16 pixel block. In order to scale an input pixel block, each of the upsampling stages 408 and 410 may be configured as a convolutional neural network (CNN). Although described and illustrated as including only two upsampling stages 408 and 410, the generator portion 402 of the trained generative model 212 is configured to implement any suitable number of upsampling stages in order to scale the text vector 204 to an appropriate output size. For instance, in an example scenario where the trained generative model 212 is configured to output images of a 64×64 pixel size, the generator portion 402 may include four upsampling stages to iteratively scale the reshaped text vector 204 to a 64×64 pixel output image size.

In order to ensure that the generator portion 402 is informed as to which pixels of a scaled pixel block correspond to portions of a reference image that are to be modified based on a textual description of target clothing, and which pixels of the reference image are to be preserved, the generative model module 122 provides information in the form of an upsampled map 208 and an upsampled image 210 at each stage of the generator portion 402. To do so, the upsampling module 120 generates scaled information 412 for use at each stage of the generator portion 402, where the scaled information 412 includes an upsampled map 308 generated from a segmentation map 202 for the reference image and an upsampled image 210 generated from a masked image 206 for the reference image at a size that corresponds to the current pixel block being processed by the generator portion 402.

For instance, the illustrated example includes three different instances of scaled information 412 generated by the upsampling module, where scaled information 412(1) is communicated to the dense layer 406, scaled information 412(2) is communicated to the upsampling stage 408, and scaled information 412(n) is communicated to the upsampling stage 410. The upsampling module 120 is configured to generate n instances of scaled information 412, where n represents any suitable integer and is determined based on a number of different stages included in the generator portion 402 of the trained generative model 212. In this manner, the generator portion 402 is provided with information describing pixels belonging to individual clothing components that need to be modified (e.g., upper body clothing, lower body clothing, shoes, etc.) as well as information describing pixels that should not be modified (e.g., pixels corresponding to a face, hair, hands, etc.) by the image generation system 104 in generating the output image 106. The scaled information 412 is concatenated with inputs to each stage of the generator portion 402 by the generative model module 122, which consequently forces outputs of the respective stages to include fewer artifacts and better visual quality when compared against conventional approaches that provide image segmentation and mask information to an image generation network at a single instance and size.

The discriminator portion 404 of the trained generative model 212 is configured to receive the output of the generator portion 402 and reduce a dimensionality of the output. For instance, the discriminator portion 402 may reduce a dimensionality of the generator portion 402's output by performing several layers of stride-2 convolution with spatial batch normalization, followed by an activation function, such as a leaky rectified linear unit (ReLU) function. Once a spatial dimensionality of an output of the discriminator portion 404 has reached a size of the pixel block initially generated by the generator portion 402 in reshaping the text vector 204 (e.g., 4×4 pixels), the discriminator portion 404 performs a 1×1 convolution followed by rectification and a 4×4 convolution to output an image 414 that the discriminator portion 404 perceives to be depicting a human subject of the reference image as wearing clothing described by the text vector 204.

Mathematically, the reference image 108 input to the trained generative model 212 including a human subject can be represented as $X \in \mathbb{R}^I$ and the text description 110 can be represented as $t \rightarrow \phi(t) \in \mathbb{R}^T$, where I represents a dimension of the reference image 108 and T represents a dimension of the text vector 204 $\phi(t)$. The generator portion 402 is configured to map the input data $\mathbb{R}^I \times \mathbb{R}^T$ to the output image 414 $Y \in \mathbb{R}^I$, with the output image 414 representing the same human subject having the same pose as depicted in the reference image 108.

In order to generate a trained generative model 212, the generative model module 122 is configured to evaluate the output image 414 generated by the generator portion 402 and discriminator portion 404 during training and determine a discriminator loss 214 associated with the output image 414. Mathematically, this discriminator loss 214 can be represented as $Loss_D$, as set forth in Equation 2 below.

$$Loss_D = \log(D(X, \phi(t))) + \frac{\log(1 - D(G(X, \phi(t)), \phi(t))) + \log(1 - D(X, \phi(t')))}{2} \quad \text{(Eq. 2)}$$

As set forth in Equation 2, X corresponds to a ground truth image for the reference image 108, G (X, $\phi(t)$) represents the output of the generator portion 402, and t' represents a mismatched text vector 204 with respect to the ground truth image. The discriminator loss 214 is then used by the generative model module 122 to train the generator portion 402 of the trained generative model 212, such that by processing a large number of training samples, parameters of the trained generative model 212 (e.g., weights of a convolutional layer, weights of an output layer, combinations thereof, and so forth) are guided toward their optimal state.

In order to improve performance of the trained generative model 212, the generative model module 122 is further configured to determine a perceptual quality loss 216 associated with an output image 414 produced by the generative model 212 during training. To do so, the generative model module 122 implements a Visual Geometry Group (VGG) network 416, which is representative of a fully trained convolutional network, such as a VGG model described by Qifeng Chen and Vladlen Koltun, "Photographic image synthesis with cascaded refinement networks," in Proceedings of the IEEE International Conference on Computer Vision, 2017, pp. 1511-1520. In such a configuration, the VGG network 416 represents a fully trained convolutional network with K intermediate layers represented as γ, where the output of a k-th layer of the VGG network 416 may be represented as $\gamma_k$.

Mathematically, the perceptual quality loss 216 can be defined as $Loss_p$, as set forth in Equation 3 below.

$$Loss_D = \sum_{k=1}^{K} \lambda_k |\gamma_k(X) - \gamma_k(G(X, \phi(t)))|_1 \quad \text{(Eq. 3)}$$

As set forth in Equation 3, $\lambda_k$ represents a weight associated with the perceptual quality loss 216 at the k-th layer towards the overall loss calculation. Both the perceptual quality loss 216 and the discriminator loss 214 are used to train the generator portion 402 of the trained generative model 212, thereby increasing a visual quality of an image 106 output by the trained generative model 212, relative to the quality of an image that would be output by a generative model trained on only one of the discriminator loss 214 or the perceptual quality loss 216. Although described as using a combination of the discriminator loss 214 and the perceptual quality loss 216, the image generation system 104 is further configured to perform the image generation techniques described herein using only one of the discriminator loss 214 or the perceptual quality loss 216. After fine-tuning the trained generative model 212 using both discriminator loss 214 and perceptual quality loss 216, the generative model module 122 outputs the trained generative model 212. The image generation system 104 can subsequently use the trained generative model 212 to generate an output image 106 depicting a human subject of a reference image 108 as wearing attire described by a text description 110.

Having considered example implementations of training a generative model and using the trained generative model to output an image depicting a person wearing textually described target clothing, consider now example implementations of generating a video including a plurality of frames individually generated using the trained generative model in accordance with aspects of the disclosure herein.

Figure 5:
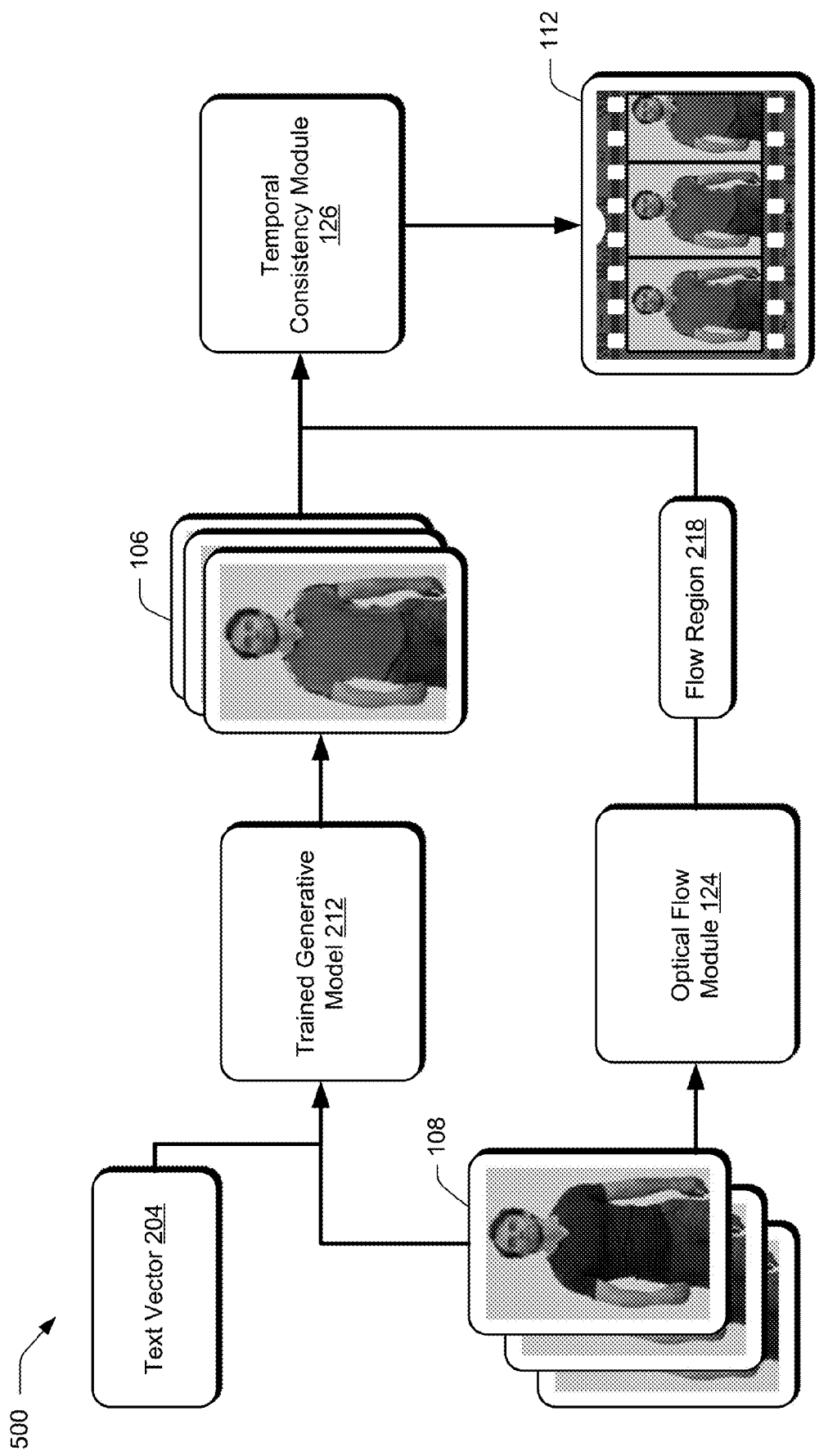
FIG. 5 illustrates an example implementation of the image generation system of FIG. 1 generating a video that depicts a human wearing text-defined target clothing using techniques described herein.

FIG. 5 illustrates an example implementation 500 of the image generation system 104 generating a video 112 that depicts a human subject of a reference video comprising a plurality of reference frames 108 as wearing clothing described by a text vector 204 in accordance with the techniques described herein. In the illustrated example, a reference video is received that includes a plurality of frames. Each of the plurality of frames is separated by the image generation system 104 and processed individually as a reference image 108, as described herein. In addition to receiving the reference video, the image generation system 104 also receives a text description 110 describing one or more articles of clothing and/or accessories that a human subject of the reference video is to be depicted as wearing in the output video 112.

The image generation system 104 may use the vectorization module 118 to generate a text vector 204, which represents information included in the text description 110 formatted in a manner that is suitable for input to the trained generative model 212. Individual ones of the reference images 108, representing individual frames of a reference video, are provided to the trained generative model 212 with the text vector 204 as described above, which causes the trained generative model to output a plurality of images 106, one for each frame of the reference video identified by a reference image 108. In each of the plurality of images 106, the human subject from the reference image 108 is depicted as wearing the clothing and/or accessories specified by the text vector 204.

In order to ensure that the plurality of images 106 output by the trained generative model 212 remain visually similar to one another when compiled for playback as the video 112, the image generation system 104 is configured to further process the images 106 based on motion of the human subject during playback of the reference images 108. To do so, the optical flow module 124 is configured to analyze the reference images 108 generated from a reference video and identify a flow region 218, which defines an optical flow for the reference video (e.g., a set of pixels for each of the images 106 that display movement of the human subject during playback of the reference video). The flow region 218 between a reference frame $X_r$ and an n-th frame $X_n$ can be defined as $X_n = W_{nr}(X_r)$, where the function $W_{nr}(\bullet)$ warps samples of $X_r$ to $X_n$. Thus, the function $W_{nr}(X_r): \mathbb{R}^I \to \mathbb{R}^I$ represents a collection of I point wise operators that contain displacement information (e.g., motion or flow information) of every single pixel of $X_r$ across two frames (e.g., $X_r$ to $X_n$) along both axes of the image 106 (e.g., along both x and y axes).

Because the generator portion of the trained generative model 212 is configured to modify only a specific set of pixels identified by the masked image 206 for the reference image 108, the flow region 218 is similarly limited to this specific set of pixels, while the rest of the reference image 108 is maintained in the corresponding output image 106. For instance, in an example implementation where the text vector 204 specifies that only a shirt of a human subject in the reference video is to be modified, then the flow region 218 is similarly limited to pixels in the images that display the shirt.

The flow region 218 is then used by the temporal consistency module 126 to refine pixel values of the output images 106 prior to compiling the images 106 into the video 112. An output of the temporal consistency module 126 for a given image 106 can be represented as $\tilde{Y}_n$, as set forth in Equation 4.

$$\tilde{Y}_n = Y_n \circ (1-M) + W_{nr}(Y_r) \circ (M) \qquad \text{(Eq. 4)}$$

As set forth in Equation 4, $Y_n$ represents the output image 106, $Y_r$ represents the corresponding reference image 108 from which the output image 106 was generated, and M represents the masked image 206 generated from the reference image 108. An evaluation of the flow region 218 specified by $W_{nr}(\bullet)$ may be evaluated using known optical flow measurement techniques, which in turn reveals a magnitude of dense optical flow corresponding to each pixel for a given pair of a reference image 108 and corresponding output image 106. The processed images 106 refined by the temporal consistency module 126 according to the flow region 218 are subsequently compiled together for playback as the video 112.

Having considered example details of generating images and videos depicting a person wearing textually defined clothing and/or accessories, consider now some example procedures to illustrate aspects of the techniques.

EXAMPLE PROCEDURES

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to FIGS. 1-5.

Figure 6:
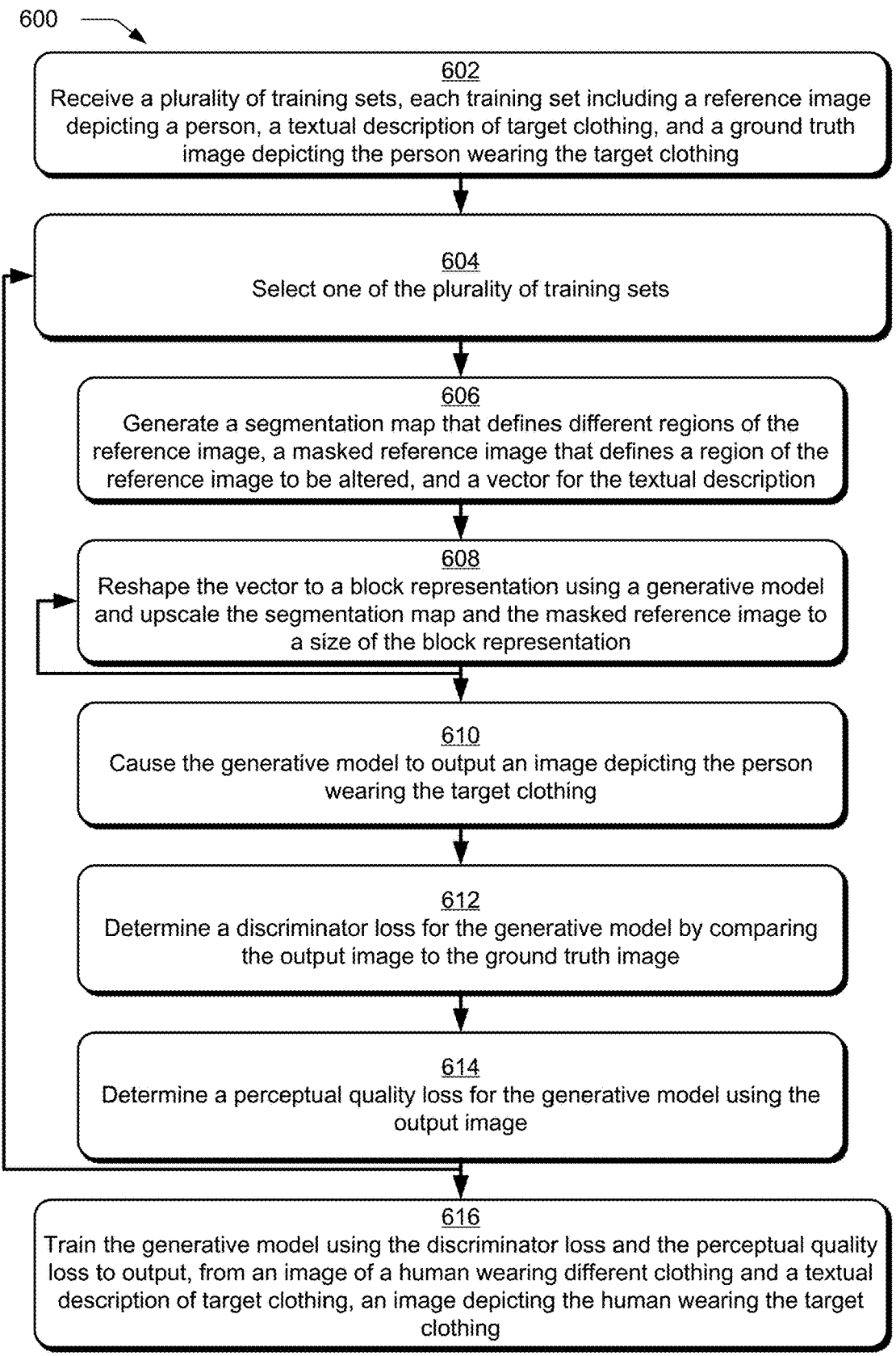
FIG. 6 is a flow diagram depicting a procedure in an example implementation for training a generative model to output an image that depicts a human wearing text-defined target clothing.

FIG. 6 depicts a procedure 600 in an example implementation of training a generative model to output an image of a human subject wearing textually defined attire using both discriminator loss and perceptual quality loss according to the techniques described herein. A plurality of training sets are received, where each training set includes a reference image depicting a person, a textual description of target clothing, and a ground truth image depicting the person wearing the target clothing (block 602). The human parsing module 114 of the image generation system 104, for instance receives reference image 108, depicting a human subject wearing clothing and the vectorization module 118 receives text description 110 including one or more words describing one or more articles of clothing and/or one or more accessories to be worn by the human subject of the reference image 108. In some implementations, the image generation system 104 is configured to receive a ground truth image for the reference image 108, which depicts the human subject of the reference image 108 in a same pose as depicted in the reference image 108, wearing the attire specified by the text description 110. Alternatively, a training set may include the text description 110 describing attire being worn by the human subject in the reference image 108, in which case the reference image 108 can serve as the ground truth image depicting the human subject wearing target clothing described by the text description 110.

One of the plurality of training sets is then selected (block 604). From the selected training set, a segmentation map that defines different regions of the reference image, a masked reference image defining a region of the reference image to be altered, and a vector of the textual description are generated (block 606). The human parsing module 114 of the image generation system 104, for instance, generates a segmentation map 202 for the reference image 108. The segmentation map 202 may be generated using a human parsing network, and includes information specifying one or more regions of a human body for the person depicted in the reference image 108. For instance, the segmentation map 202 may include information defining centers of the regions of head, upper body, lower body, left arm, right arm, left leg, right leg, left foot, and right foot. Each region can be further parsed and defined by specific labels such as hat, hair, sunglasses, face, etc. In implementations where the human subject depicted in the reference image 108 is wearing clothing, the different body regions defined by the segmentation map 202 are extended to encompass clothing that covers a corresponding portion or entirety of the body region. For instance, a "left foot" region of the segmentation map 202 may be defined as including a left shoe in an example implementation where the human subject of the reference image 108 is wearing shoes. In this manner, the segmentation map 202 includes information identifying different body parts for a human depicted in the reference image 108, where the different body parts include clothing being worn by the human over the corresponding body part.

The vectorization module 118 of the image generation system 104 is configured to receive the text description 110 and generate a text vector 204, which is representative of textual information included in the text description 110 encoded into a vector format that is suitable for input to a generative model configured to generate and output the image 106 using the techniques described herein. The segmentation map 202 and the text vector 204 are then provided to the masking module 116 of the image generation system 104, which uses the text vector 204 and the segmentation map 202 to generate a masked image 206 for the reference image 108. The masked image 206 is representative of an instance of the reference image 108 with one or more human body regions specified by the segmentation map 202 masked out according to the text vector 204. The one or more regions of the masked image 206 that are "masked out," each include a set of pixels with values replaced with mask pixel values (e.g., zero), while pixels of the reference image 108 that are to be preserved in the output image 106 are represented by their original pixel values. The masked regions of the masked image 206 are determined by comparing the text vector 204 to the segmentation map 202 and identifying the corresponding regions of the segmentation map 202 that correspond to the target clothing described by the text description 110. For instance, in response to determining, from the text vector 204, that the text description 110 describes a "raspberry short sleeve top," the masking module 116 may identify that the text vector 204 indicates an upper body region of the segmentation map 202 is to be masked in the masked image 206.

After generating the segmentation map, the masked image, and the text vector, the text vector is reshaped to a block representation using a generative model and the segmentation map and masked image are upscaled to a size of the block representation (block 608). The text vector 204 is communicated to the generative model module 122, which is configured to concatenate the text vector 204 with a noise vector for training the generative model and passes the concatenated vector through a dense layer 406 of the generator portion 402 to reshape the vector to a pixel block (e.g., a 4×4 pixel block). The upsampling module 120 of the image generation system 104 generates an upsampled map 208 and an upsampled image 210, which are upsampled to a size of the pixel block generated from the concatenated vectors. The upsampled map 208 is representative of an instance of the segmentation map 202 upscaled to a size of the pixel block and the upsampled image 210 is representative of an instance of the masked image 206 upscaled to the size of the pixel block. As indicated by the arrow returning to block 608, the upsampling module 120 is configured to generate a plurality of upsampled maps 208 and a plurality of upsampled images 210, one for each upsampling stage of the generative model being trained by the generative model module 122, such as one of scaled information 412. In this manner, the generative model is provided with information describing which pixels of a scaled pixel block correspond to portions of a reference image that are to be modified based on a textual description of target clothing, and which pixels of the reference image are to be preserved at each stage of processing by a generator portion of the generative model, such as the generator portion 402 of the trained generative model 212.

The generative model is then caused to output an image depicting the person wearing the target clothing described by the text description (block 610). The generative model module 122 of the image generation system 104, for instance, passes an output of the generator portion 402 of a generative model to a discriminator portion 404 of the generative model along with the text vector 204 and causes the discriminator portion 404 to output image 414. Image 414 is representative of an image that the discriminator portion 404 perceives to be depicting a human subject of the reference image as wearing clothing described by the text vector 204.

A discriminator loss for the generative model is then determined by comparing the output image to the ground truth image for the training dataset (block 612). The generative model module 122, for instance, compares image 414 to the ground truth image corresponding to the reference image 108 and the text description 110 of the training set and determines the discriminator loss 214 based on the comparison. Mathematically, this discriminator loss 214 can be represented as $Loss_D$, as set forth in Equation 2 above. In addition to determining the discriminator loss, a perceptual quality loss for the generative model is determined using the output image (block 614). The generative model module 122, for instance, implements a trained VGG network 416 to determine a perceptual quality loss 216 associated with the image 414 output by the generative model 212 during training. Mathematically, the perceptual quality loss 216 can be defined as $Loss_p$, as set forth in Equation 3 above.

Using both the discriminator loss and the perceptual quality loss, the generative model is trained to output, from an image of a human wearing different clothing and a textual description of target clothing, and image of the human wearing the target clothing (block 614). As indicated by the arrow returning to block 604 from block 614, the image generation system 104 proceeds to determine both a discriminator loss 214 and a perceptual quality loss 216 from each of the plurality of training datasets. Following each determination of the discriminator loss 214 and the perceptual quality loss 216 for a given training set, the generative model module 122 updates one or more parameters of the generative model 212 to guide the parameters toward their optimal state. Training the generative model 212 may continue until one or more of the discriminator loss 214 or the perceptual quality loss 216 satisfy one or more threshold loss values. Alternatively, training the generative model 212 may continue until all the training datasets have been processed by the image generation system 104. Upon completion of training, the generative model module 122 is configured to output the trained generative model 212. The trained generative model 212 is representative of functionality of the image generation system 104 to subsequently receive a new reference image 108 depicting a human subject wearing clothing and a textual description 110 of different target clothing and generate an output image 106 depicting the human subject wearing the target clothing.

Figure 7:
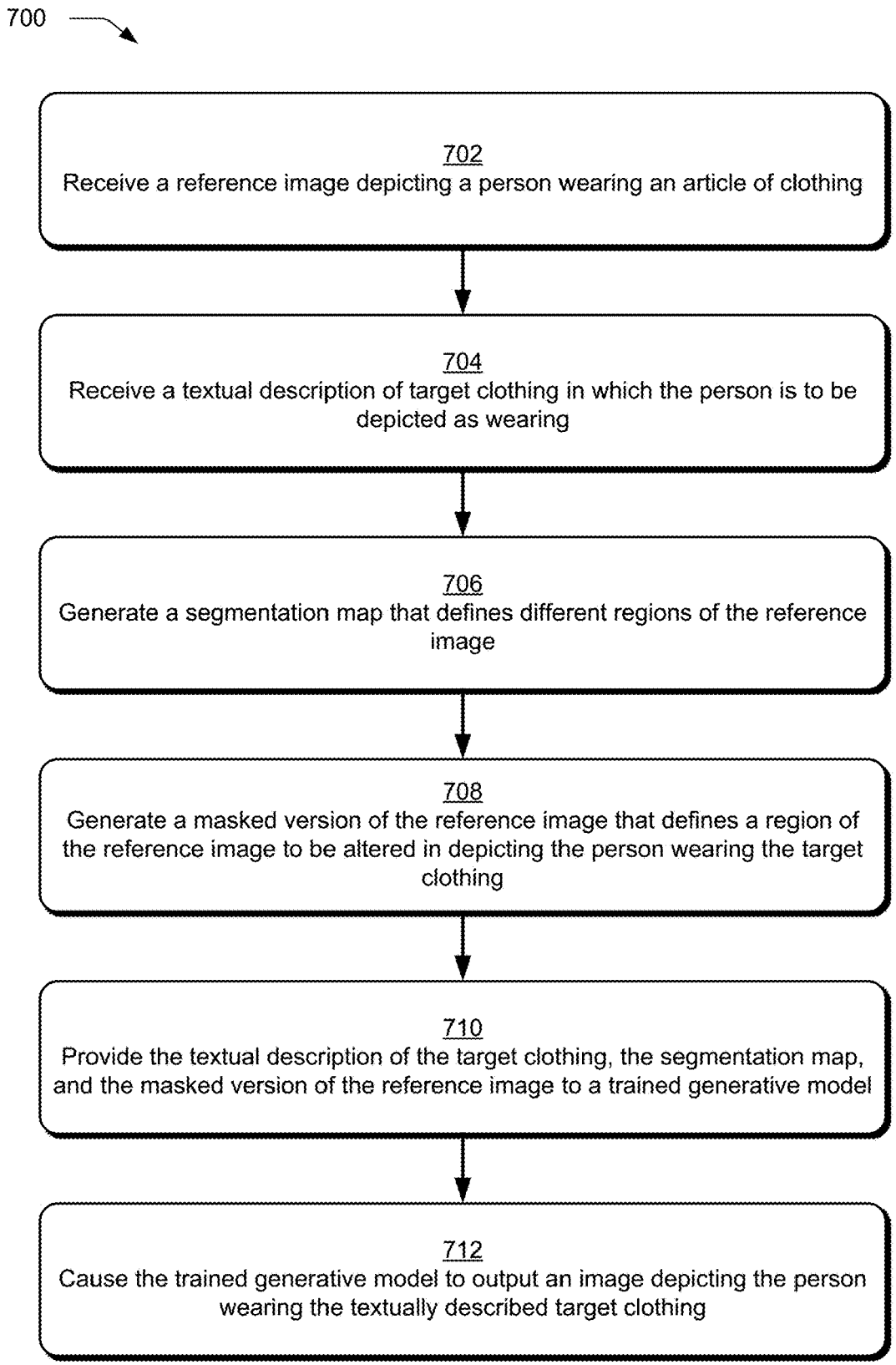
FIG. 7 is a flow diagram depicting a procedure in an example implementation for generating an image depicting a human wearing text-defined target clothing using the techniques described herein.

FIG. 7 depicts a procedure 700 in an example implementation of outputting an image depicting a person wearing textually described target clothing using a trained generative model in accordance with the techniques described herein. A reference image depicting a person wearing an article of clothing is received (block 702). The human parsing module 114 of the image generation system 104, for instance, receives reference image 108 depicting a human subject wearing at least one article of clothing. A textual description of target clothing in which the person is to be depicted as wearing is also received (block 704). The vectorization module 118 of the image generation system 104, for instance, receives a text description 110 including at least one word describing target clothing that the human subject of the reference image 108 is to be depicted as wearing.

A segmentation map defining different regions of the reference image is generated (block 706). The human parsing module 114 of the image generation system 104, for instance, generates a segmentation map 202 for the reference image 108. The segmentation map 202 may be generated using a human parsing network, and includes information specifying one or more regions of a human body for the person depicted in the reference image 108. For instance, the segmentation map 202 may include information defining centers of the regions of head, upper body, lower body, left arm, right arm, left leg, right leg, left foot, and right foot. Each region can be further parsed and defined by specific labels such as hat, hair, sunglasses, face, etc. In implementations where the human subject depicted in the reference image 108 is wearing clothing, the different body regions defined by the segmentation map 202 are extended to encompass clothing that covers a corresponding portion or entirety of the body region. For instance, a "left foot" region of the segmentation map 202 may be defined as including a left shoe in an example implementation where the human subject of the reference image 108 is wearing shoes. In this manner, the segmentation map 202 includes information identifying different body parts for a human depicted in the reference image 108, where the different body parts include clothing being worn by the human over the corresponding body part.

A masked version of the reference image that defines a region of the reference image to be altered in depicting the person wearing the target clothing is then generated (block 708). The vectorization module 118 of the image generation system 104 is configured to receive the text description 110 and generate a text vector 204, which is representative of textual information included in the text description 110 encoded into a vector format that is suitable for input to a generative model configured to generate and output the image 106 using the techniques described herein. The segmentation map 202 and the text vector 204 are then provided to the masking module 116 of the image generation system 104, which uses the text vector 204 and the segmentation map 202 to generate a masked image 206 for the reference image 108.

The masked image 206 is representative of an instance of the reference image 108 with one or more human body regions specified by the segmentation map 202 masked out according to the text vector 204. The one or more regions of the masked image 206 that are "masked out," each include a set of pixels with values replaced with mask pixel values (e.g., zero), while pixels of the reference image 108 that are to be preserved in the output image 106 are represented by their original pixel values. The masked regions of the masked image 206 are determined by comparing the text vector 204 to the segmentation map 202 and identifying the corresponding regions of the segmentation map 202 that correspond to the target clothing described by the text description 110. For instance, in response to determining, from the text vector 204, that the text description 110 describes a "raspberry short sleeve top," the masking module 116 may identify that the text vector 204 indicates an upper body region of the segmentation map 202 is to be masked in the masked image 206.

The textual description of the target clothing, the segmentation map, and the masked version of the reference image are then provided to a trained generative model (block 710). The vectorization module 118 communicates the text vector 204 to the generative model module 122, which provides the text vector 204 to the trained generative model 212. Upon receipt of the text vector 204, the trained generative model 212 is configured to reshape the text vector 204 into a pixel block. The upsampling module 120 is configured to generate an upsampled map 208 from the segmentation map 202 and an upsampled image 210 from the masked image 206, where the upsampled map 208 and the upsampled image 210 are each scaled to a size of the pixel block generated from the text vector 204.

The trained generative model 212 is configured to use the text vector 204 to generate pixel values for pixels of the masked image 206 that are represented as being masked in the upsampled image 210, while maintaining pixel values from the masked image 206 that are not represented as being masked. In order to ensure that the trained generative model 212 is provided with mask information at each stage of generating the pixel values to replace masked pixel values, the upsampling module 120 is configured to provide an upsampled map 208 and an upsampled image 210 to the trained generative model 212 at a size that corresponds to a current processing size of the pixel block generated from the text vector 204. The upsampled map 208 and the upsampled image 210 are then concatenated with the inputs to each stage of the trained generative model 212's pixel generation, which mitigates a number of boundary artifacts present in pixel values generated by the trained generative model 212.

The trained generative model is then caused to output an image depicting the person wearing the textually described target clothing (block 712). The trained generative model 212 of the generative model module 122, for instance, outputs image 106, which depicts a human subject of the reference image 108 as wearing attire described by the text description 110. By virtue of being trained using both discriminator loss 214 and perceptual quality loss 216, the image 106 output by the trained generative model 212 includes sharp image boundaries characteristic of generative model output along with sharper image boundaries between depicted objects, relative to conventional approaches that do not train a generative model using this combination of multiple loss functions.

Figure 8:
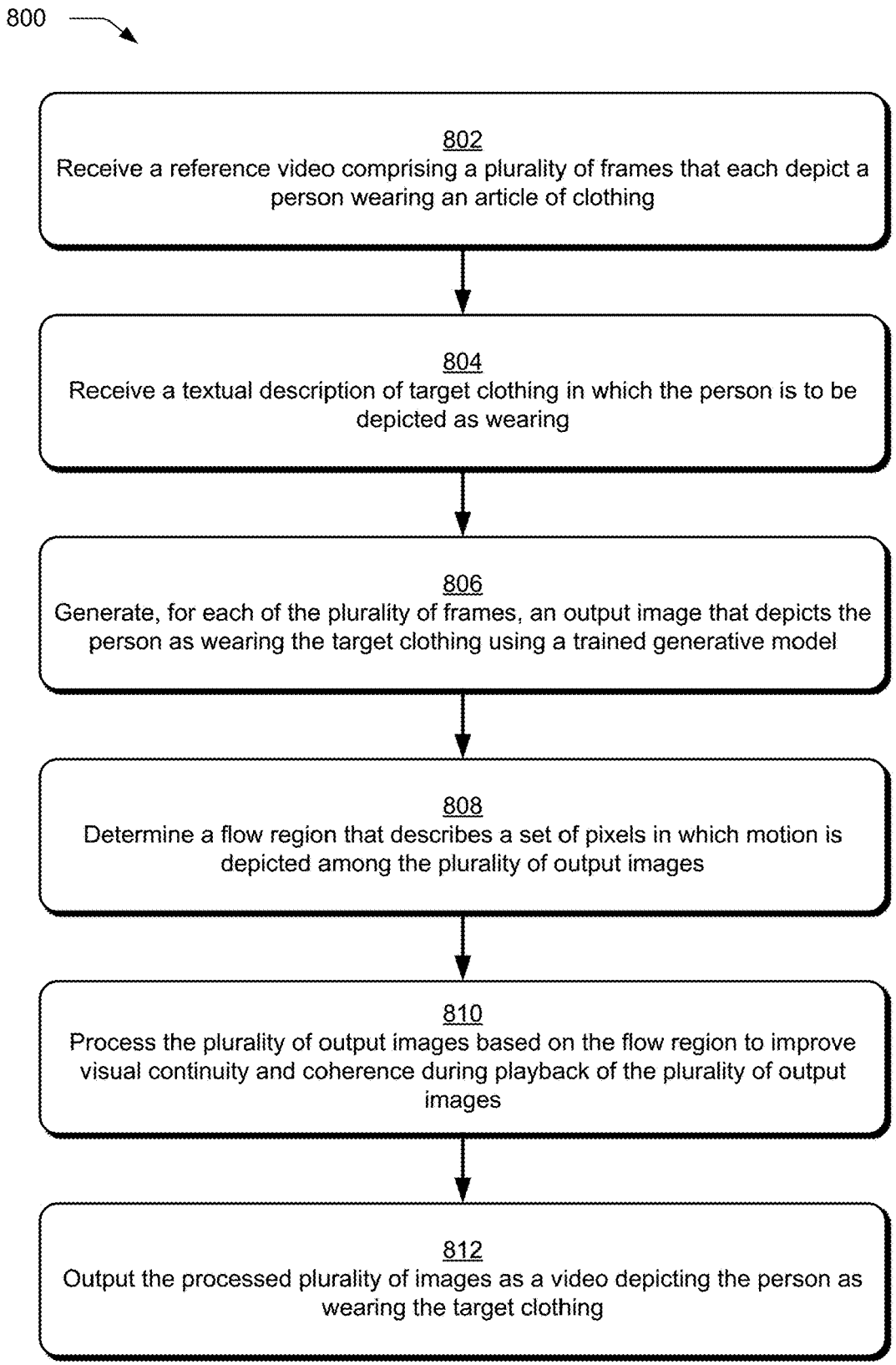
FIG. 8 is a flow diagram depicting a procedure in an example implementation for generating a video depicting human wearing text-defined target clothing using the techniques described herein.

FIG. 8 depicts a procedure 800 in an example implementation of outputting a video depicting a person wearing textually described target clothing. A reference video comprising a plurality of frames that each depict a person wearing an article of clothing is received (block 704). A reference video depicting a user wearing at least one article of clothing is received by the image generation system 104, which parses the reference video into individual frames, where each individual frame may be represented by the reference image 108. A textual description of target clothing in which the person is to be depicted as wearing is also received (block 804). The vectorization module 118 of the image generation system 104, for instance, receives a text description 110 including at least one word describing target clothing that the human subject of the reference image 108 is to be depicted as wearing.

For each of the plurality of frames of the reference video, an output image depicting the persona as wearing the target clothing is generated using a trained generative model (block 806). The generative model module 122 of the image generation system 104, for instance, generates an output image 106 for each frame of the reference video (e.g., reference image 108) according to the operations described above with respect to procedure 700. A flow region that describes a set of pixels in which motion is depicted among the plurality of output images is then determined (block 808). The optical flow module 124, for instance, analyzes the plurality of frames of the reference video, collectively described as different instances of the reference image 108 and determines the flow region 218 for the plurality of frames. The flow region 218 specifies a set of pixels between an initial frame (e.g., an initial image 106) and a final frame (e.g., a final image 106) included during playback of the video 112.

Using the flow region, the plurality of output images are further processed to improve visual continuity and coherence during playback of the plurality of output images (block 810). The temporal consistency module 126 of the image generation system 104, for instance, receives the plurality of output images 106 generated from the plurality of frames of the reference video and processes a subset of pixels in each output image 106 specified in the flow region 218. By processing the output images 106 according to the flow region 218, the temporal consistency module 126 ensures that different textures, colors, shading values, and so forth are applied in a consistent manner across the plurality of output images 106. Because each output image 106 is generated based on a corresponding reference image 108 for a particular frame of a reference video, processing the output images 106 according to the flow region 218 removes discrepancies that would otherwise occur if the output images 106 were directly compiled into a video format. In this manner, the temporal consistency module 126 outputs refined images 106 with high temporal consistency to produce a visually realistic video output.

The processed plurality of images are then output as a video depicting the person as wearing the textually described target clothing (block 812). The temporal consistency module 126 of the image generation system 104, for instance, outputs video 112, which depicts the human subject of the frames of the reference video (e.g., the reference images 108) as wearing the attire described by the text description 110.

Having described example procedures in accordance with one or more implementations, consider now an example system and device that can be utilized to implement the various techniques described herein.

Example System and Device

Figure 9:
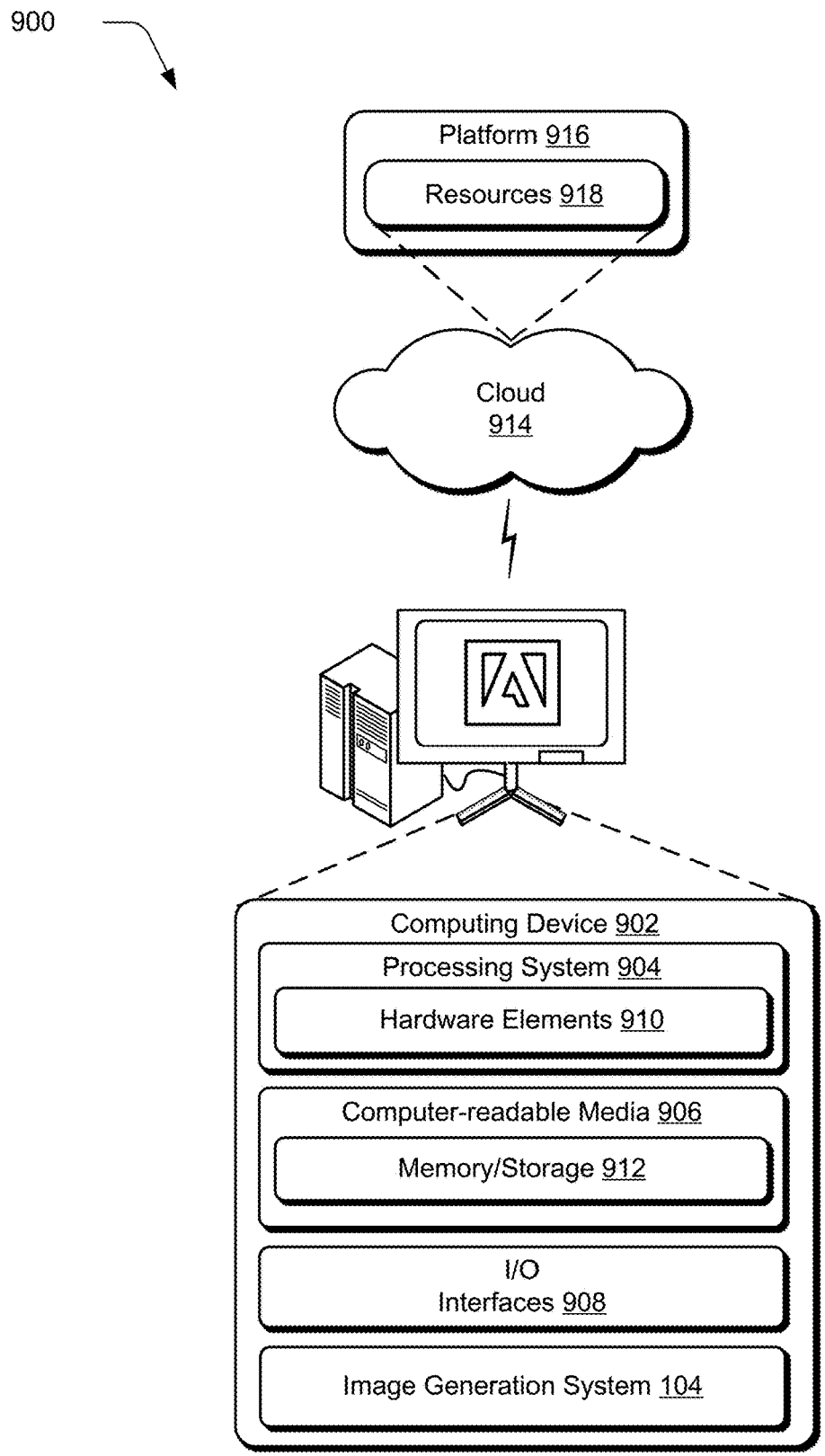
FIG. 9 illustrates an example system including various components of an example device that can be implemented as a computing device as described and/or utilized with reference to FIGS. 1-8 to implement the techniques described herein.

FIG. 9 illustrates an example system generally at 900 that includes an example computing device 902 that is representative of one or more computing systems and/or devices that may implement the various techniques described herein. This is illustrated through inclusion of the image generation system 104. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system comprising:
a memory component; and
a processing device coupled to the memory component, the processing device to perform operations comprising:
  receiving a reference video comprising a plurality of frames depicting a person;
  receiving a textual description of target clothing;

generating, using a machine learning model, a plurality of output images, each of the plurality of output images depicting the person as wearing the target clothing and being generated by providing a corresponding one of the plurality of frames as input to the machine learning model;

processing each of the plurality of output images by:
determining a flow region describing a set of pixels in the output image that depict motion of the person; and
modifying a pixel value of at least one pixel in the set of pixels; and outputting the processed plurality of output images as a video depicting the person wearing the target clothing.

2. The system of claim 1, wherein modifying the pixel value of the at least one pixel in the set of pixels comprises identifying a corresponding pixel value of a temporally adjacent one of the plurality of output images and adjusting the pixel value of the at least one pixel in the set of pixels based on the corresponding pixel value.

3. The system of claim 1, wherein processing each of the plurality of output images comprises maintaining a pixel value for each pixel in the output image outside the flow region.

4. The system of claim 1, wherein the machine learning model is configured to generate each of the plurality of output images by generating a segmentation map that specifies at least one body region of the person from the corresponding one of the plurality of frames, wherein the flow region for each of the plurality of output images encompasses a set of pixels in the output image including the at least one body region of the person specified by the segmentation map for the output image.

5. The system of claim 4, wherein the machine learning model comprises a human parsing neural network trained to identify a pose structure of the person depicted in the corresponding one of the plurality of frames.

6. The system of claim 4, wherein the machine learning model comprises a generative adversarial network and generating each of the plurality of output images comprises processing the textual description of the target clothing using the generative adversarial network and, for each of a plurality of neural network layers of the generative adversarial network, upscaling the segmentation map to a scale of the neural network layer and providing the upscaled segmentation map to the neural network layer.

7. The system of claim 1, wherein generating each of the plurality of output images comprises generating a text vector from the textual description and providing the text vector and the corresponding one of the plurality of frames as input to the machine learning model.

8. In a digital medium environment, a method comprising:
receiving, by a processing device, a reference video comprising a plurality of frames depicting a person;
receiving, by the processing device, a textual description of target clothing;
generating, by the processing device, a plurality of output images using a machine learning model, each of the plurality of output images depicting the person as wearing the target clothing and being generated by providing a corresponding one of the plurality of frames as input to the machine learning model;

processing, by the processing device, each of the plurality of output images by:
determining a flow region describing a set of pixels in the output image that depict motion of the person; and
modifying a pixel value of at least one pixel in the set of pixels; and outputting, by the processing device, the processed plurality of output images as a video depicting the person wearing the target clothing.

9. The method of claim 8, wherein modifying the pixel value of the at least one pixel in the set of pixels comprises identifying a corresponding pixel value of a temporally adjacent one of the plurality of output images and adjusting the pixel value of the at least one pixel in the set of pixels based on the corresponding pixel value.

10. The method of claim 8, wherein processing each of the plurality of output images comprises maintaining a pixel value for each pixel in the output image outside the flow region.

11. The method of claim 8, wherein the machine learning model is configured to generate each of the plurality of output images by generating a segmentation map that specifies at least one body region of the person from the corresponding one of the plurality of frames, wherein the flow region is determined to encompass the at least one body region of the person specified by the segmentation map for the output image.

12. The method of claim 11, wherein the machine learning model comprises a human parsing neural network trained to identify a pose structure of the person depicted in the corresponding one of the plurality of frames.

13. The method of claim 11, wherein the machine learning model comprises a generative adversarial network and generating each of the plurality of output images comprises processing the textual description of the target clothing using the generative adversarial network and, for each of a plurality of neural network layers of the generative adversarial network, upscaling the segmentation map to a scale of the neural network layer and providing the upscaled segmentation map to the neural network layer.

14. The method of claim 8, wherein generating each of the plurality of output images comprises generating a text vector from the textual description and providing the text vector and the corresponding one of the plurality of frames as input to the machine learning model.

15. A system comprising:
a memory component; and
a processing device coupled to the memory component, the processing device to perform operations comprising:
receiving a reference image depicting a person;
receiving a textual description of target clothing; and
generating an image depicting the person wearing the target clothing by:
generating, using a first machine learning model, a segmentation map for the reference image that defines at least one body region of the person depicted in the reference image;
generating a masked image that specifies a plurality of pixels in the reference image that are to be modified to depict the person wearing the target clothing based on the segmentation map; and
causing a second machine learning model to output the image depicting the person wearing the target clothing by providing the textual description of the target clothing, the segmentation map, and the masked image as inputs to the second machine learning model and, for each of a plurality of stages of the second machine learning model, upscaling the segmentation map and providing the upscaled segmentation map as an input to the stage of the second machine learning model.

16. The system of claim 15, the operations further comprising generating a text vector from the textual description of the target clothing, wherein providing the textual description of the target clothing as input to the second machine learning model comprises providing the text vector as input to the second machine learning model.

17. The system of claim 15, wherein the first machine learning model comprises a human parsing neural network trained to identify a pose structure for the person depicted in the reference image.

18. The system of claim 15, wherein the masked image further specifies a different plurality of pixels in the reference image that are to be maintained in the image depicting the person wearing the target clothing.

19. The system of claim 15, wherein the segmentation map defines a plurality of body regions of the person depicted in the reference image, the operations further comprising identifying one of the plurality of body regions based on the textual description of target clothing and causing the second machine learning model to output the image depicting the person wearing the target clothing by modifying pixel values in the reference image corresponding to the one of the plurality of body regions.

20. The system of claim 15, wherein a body position of the person depicted in the reference image is defined by a pose and the image depicting the person wearing the target clothing depicts the person in the pose.

* * * * *